US012711968B2

(12) United States Patent
Kuznetsov et al.

(10) Patent No.: US 12,711,968 B2
(45) **Date of Patent: *Aug. 18, 2026**

(54) MULTIPLE SCRAMBLED LAYERS FOR AUDIO WATERMARKING

(71) Applicant: The Nielsen Company (US), LLC, New York, NY (US)

(72) Inventors: Vladimir Kuznetsov, Ellicott City, MD (US); Sadhana Gupta, Columbia, MD (US); Wendell Lynch, East Lansing, MI (US)

(73) Assignee: The Nielsen Company (US), LLC, New York, NY (US)

( * ) Notice: Subject to any disclaimer, the term of this patent is extended or adjusted under 35 U.S.C. 154(b) by 592 days.

This patent is subject to a terminal disclaimer.

(21) Appl. No.: 18/306,026

(22) Filed: Apr. 24, 2023

(65) Prior Publication Data

US 2023/0335144 A1 Oct. 19, 2023

Related U.S. Application Data

(63) Continuation of application No. 17/079,896, filed on Oct. 26, 2020, now Pat. No. 11,636,864, which is a (Continued)

(51) Int. Cl.
*G10L 19/018* (2013.01)
*G06T 1/00* (2006.01)

(52) U.S. Cl.
CPC .......... *G10L 19/018* (2013.01); *G06T 1/0028* (2013.01); *G06T 1/0071* (2013.01)

(58) Field of Classification Search
CPC ................. G06T 1/0028; G06T 1/0071; G06T 2201/0202; G10L 19/018
See application file for complete search history.

(56) References Cited

U.S. PATENT DOCUMENTS 5,450,490 A 9/1995 Jensen et al.
5,764,763 A 6/1998 Jensen et al.

(Continued)

FOREIGN PATENT DOCUMENTS

KR 20180058611 A 6/2018
WO 2020131519 A1 6/2020

OTHER PUBLICATIONS

United States Patent and Trademark Office, "Non-Final Office Action," issued in connection with U.S. Appl. No. 16/225,438, dated Jan. 10, 2020, 5 Pages.

(Continued)

*Primary Examiner* — Thomas H Maung

(57) ABSTRACT

Apparatus, systems, articles of manufacture, and methods are disclosed for multiple scrambled layers for audio watermarking. An example system includes a processor to execute instructions to: divide the watermark into a plurality of watermark symbols; map the watermark symbols to a plurality of frequency bins according to a first distribution scheme to create a first watermark layer having first frequency bins and a second watermark layer having second frequency bins, subsets of adjacent ones of the plurality of frequency bins grouped into a corresponding plurality of frequency clumps; determine a sequence for shifting watermark symbols to cause different combinations of watermark symbols that include one watermark symbol from each watermark layer to share a first number of frequency bins, the first number to be less than a number of watermark symbols in the different combinations; and generate a second distribution scheme to map the watermark symbols.

19 Claims, 12 Drawing Sheets

Related U.S. Application Data continuation of application No. 16/225,438, filed on Dec. 19, 2018, now Pat. No. 10,818,303.

(56) References Cited

U.S. PATENT DOCUMENTS

| | | | | |
|---|---|---|---|---|
| 6,421,445 | B1 | 7/2002 | Jensen et al. | |
| 6,845,360 | B2 | 1/2005 | Jensen et al. | |
| 6,871,180 | B1 | 3/2005 | Neuhauser et al. | |
| 6,952,774 | B1 | 10/2005 | Kirovski et al. | |
| 7,197,368 | B2 | 3/2007 | Kirovski et al. | |
| 7,206,649 | B2 | 4/2007 | Kirovski et al. | |
| 7,487,356 | B2 | 2/2009 | Kunisa | |
| 8,359,205 | B2 | 1/2013 | Topchy et al. | |
| 8,705,736 | B2 | 4/2014 | Haas et al. | |
| 10,134,408 | B2 | 11/2018 | Srinivasan et al. | |
| 10,147,433 | B1 * | 12/2018 | Bradley | G10L 19/018 |
| 10,467,286 | B2 | 11/2019 | Srinivasan et al. | |
| 2003/0112974 | A1 | 6/2003 | Levy | |
| 2003/0152225 | A1 | 8/2003 | Kunisa | |
| 2004/0059581 | A1 | 3/2004 | Kirovski et al. | |
| 2004/0073916 | A1 | 4/2004 | Petrovic et al. | |
| 2004/0102961 | A1 | 5/2004 | Jensen et al. | |
| 2005/0033579 | A1 | 2/2005 | Bocko et al. | |
| 2005/0055214 | A1 | 3/2005 | Kirovski et al. | |
| 2005/0108542 | A1 | 5/2005 | Kirovski et al. | |
| 2006/0239501 | A1 * | 10/2006 | Petrovic | H04N 1/32203 380/54 |
| 2006/0239502 | A1 | 10/2006 | Petrovic et al. | |
| 2006/0239503 | A1 | 10/2006 | Petrovic et al. | |
| 2007/0039018 | A1 | 2/2007 | Saslow et al. | |
| 2007/0300066 | A1 | 12/2007 | Srinivasan | |
| 2008/0002854 | A1 | 1/2008 | Tehranchi et al. | |
| 2008/0310673 | A1 | 12/2008 | Petrovic et al. | |
| 2010/0106510 | A1 | 4/2010 | Topchy et al. | |
| 2010/0106718 | A1 | 4/2010 | Topchy et al. | |
| 2010/0111355 | A1 | 5/2010 | Petrovic et al. | |
| 2010/0223062 | A1 | 9/2010 | Srinivasan et al. | |
| 2010/0228857 | A1 | 9/2010 | Petrovic et al. | |
| 2010/0287579 | A1 | 11/2010 | Petrovic et al. | |
| 2011/0286625 | A1 | 11/2011 | Petrovic et al. | |
| 2012/0101827 | A1 | 4/2012 | Topchy et al. | |
| 2013/0096706 | A1 | 4/2013 | Srinivasan et al. | |
| 2013/0114847 | A1 * | 5/2013 | Petrovic | G06V 30/1914 382/100 |
| 2014/0114456 | A1 | 4/2014 | Stavropoulos et al. | |
| 2015/0039321 | A1 | 2/2015 | Neuhauser et al. | |
| 2015/0168538 | A1 | 6/2015 | Bradley et al. | |
| 2017/0025128 | A1 * | 1/2017 | Blesser | G10L 19/018 |
| 2017/0061975 | A1 | 3/2017 | Srinivasan et al. | |
| 2017/0148126 | A1 | 5/2017 | Srinivasan | |
| 2017/0371960 | A1 | 12/2017 | Srinivasan et al. | |
| 2018/0144755 | A1 | 5/2018 | Lee et al. | |
| 2020/0202874 | A1 | 6/2020 | Kuznetsov et al. | |

OTHER PUBLICATIONS

International Searching Authority, "International Search Report," issued in connection with International Patent Application No. PCT/US2019/065691, dated Mar. 30, 2020, 3 Pages.

International Searching Authority, "Written Opinion" issued in connection with Application No. PCT/US2019/065691, dated Mar. 30, 2020, 6 pages.

United States Patent and Trademark Office, "Notice of Allowance," issued in connection with U.S. Appl. No. 16/225,438, dated Jun. 23, 2020, 10 Pages.

United States Patent and Trademark Office, "Notice of Allowance and Fees Due," issued in U.S. Appl. No. 17/079,896, mailed on Dec. 27, 2022, 2 pages.

International Searching Authority, "International Preliminary Report on Patentability," issued in connection with International Patent Application No. PCT/US2019/065691, dated Jul. 1, 2021, 8 pages.

European Patent Office, "European Search Report," issued in connection with European patent application No. 19900063.9, Jun. 24, 2022, 5 pages.

United States Patent and Trademark Office, "Non-Final Office Action," issued in U.S. Appl. No. 17/079,896 on Sep. 1, 2022, 8 pages.

Canadian Intellectual Property Office, "Examiner's Report," issued in connection with Canadian Patent Application No. 3,123,624, dated Sep. 1, 2022, 3 pages.

United States Patent and Trademark Office, "Notice of Allowance and Fees Due," issued in U.S. Appl. No. 17/079,896, mailed on Dec. 16, 2022, 5 pages.

Canadian Intellectual Property Office, "Notice of Allowance", issued in connection with CA Patent Application No. 3,123,624 on Aug. 8, 2023, 1 page.

* cited by examiner

| (1, 1) | (1, 2) | (1, 3) | (1, 4) | (1, 5) | (1, 6) | (1, 7) | (1, 8) | (1, 9) | (1,10) | (1,11) | (1,12) |
|---|---|---|---|---|---|---|---|---|---|---|---|
| (2, 1) | (2, 2) | (2, 3) | (2, 4) | (2, 5) | (2, 6) | (2, 7) | (2, 8) | (2, 9) | (2,10) | (2,11) | (2,12) |
| (3, 1) | (3, 2) | (3, 3) | (3, 4) | (3, 5) | (3, 6) | (3, 7) | (3, 8) | (3, 9) | (3,10) | (3,11) | (3,12) |
| (4, 1) | (4, 2) | (4, 3) | (4, 4) | (4, 5) | (4, 6) | (4, 7) | (4, 8) | (4, 9) | (4,10) | (4,11) | (4,12) |
| (5, 1) | (5, 2) | (5, 3) | (5, 4) | (5, 5) | (5, 6) | (5, 7) | (5, 8) | (5, 9) | (5,10) | (5,11) | (5,12) |
| (6, 1) | (6, 2) | (6, 3) | (6, 4) | (6, 5) | (6, 6) | (6, 7) | (6, 8) | (6, 9) | (6,10) | (6,11) | (6,12) |
| (7, 1) | (7, 2) | (7, 3) | (7, 4) | (7, 5) | (7, 6) | (7, 7) | (7, 8) | (7, 9) | (7,10) | (7,11) | (7,12) |
| (8, 1) | (8, 2) | (8, 3) | (8, 4) | (8, 5) | (8, 6) | (8, 7) | (8, 8) | (8, 9) | (8,10) | (8,11) | (8,12) |
| (9, 1) | (9, 2) | (9, 3) | (9, 4) | (9, 5) | (9, 6) | (9, 7) | (9, 8) | (9, 9) | (9,10) | (9,11) | (9,12) |
| (10, 1) | (10, 2) | (10, 3) | (10, 4) | (10, 5) | (10, 6) | (10, 7) | (10, 8) | (10, 9) | (10,10) | (10,11) | (10,12) |
| (11, 1) | (11, 2) | (11, 3) | (11, 4) | (11, 5) | (11, 6) | (11, 7) | (11, 8) | (11, 9) | (11,10) | (11,11) | (11,12) |
| (12, 1) | (12, 2) | (12, 3) | (12, 4) | (12, 5) | (12, 6) | (12, 7) | (12, 8) | (12, 9) | (12,10) | (12,11) | (12,12) |

FIG. 2

| | 12 Bins in a Clump | | | | | | | | | | | |
|---|---|---|---|---|---|---|---|---|---|---|---|---|
| 10 CLUMPS | (1, 1) | (1, 2) | (1, 3) | (1, 4) | (1, 5) | (1, 6) | (1, 7) | (1, 8) | (1, 9) | (1,10) | (1,11) | (1,12) |
| | (2, 1) | (2, 2) | (2, 3) | (2, 4) | (2, 5) | (2, 6) | (2, 7) | (2, 8) | (2, 9) | (2,10) | (2,11) | (2,12) |
| | (3, 1) | (3, 2) | (3, 3) | (3, 4) | (3, 5) | (3, 6) | (3, 7) | (3, 8) | (3, 9) | (3,10) | (3,11) | (3,12) |
| | (4, 1) | (4, 2) | (4, 3) | (4, 4) | (4, 5) | (4, 6) | (4, 7) | (4, 8) | (4, 9) | (4,10) | (4,11) | (4,12) |
| | (5, 1) | (5, 2) | (5, 3) | (5, 4) | (5, 5) | (5, 6) | (5, 7) | (5, 8) | (5, 9) | (5,10) | (5,11) | (5,12) |
| | (6, 1) | (6, 2) | (6, 3) | (6, 4) | (6, 5) | (6, 6) | (6, 7) | (6, 8) | (6, 9) | (6,10) | (6,11) | (6,12) |
| | (7, 1) | (7, 2) | (7, 3) | (7, 4) | (7, 5) | (7, 6) | (7, 7) | (7, 8) | (7, 9) | (7,10) | (7,11) | (7,12) |
| | (8, 1) | (8, 2) | (8, 3) | (8, 4) | (8, 5) | (8, 6) | (8, 7) | (8, 8) | (8, 9) | (8,10) | (8,11) | (8,12) |
| | (9, 1) | (9, 2) | (9, 3) | (9, 4) | (9, 5) | (9, 6) | (9, 7) | (9, 8) | (9, 9) | (9,10) | (9,11) | (9,12) |
| | (10, 1) | (10, 2) | (10, 3) | (10, 4) | (10, 5) | (10, 6) | (10, 7) | (10, 8) | (10, 9) | (10,10) | (10,11) | (10,12) |
| | (11, 1) | (11, 2) | (11, 3) | (11, 4) | (11, 5) | (11, 6) | (11, 7) | (11, 8) | (11, 9) | (11,10) | (11,11) | (11,12) |
| | (12, 1) | (12, 2) | (12, 3) | (12, 4) | (12, 5) | (12, 6) | (12, 7) | (12, 8) | (12, 9) | (12,10) | (12,11) | (12,12) |

FIG. 3

| | 12 Bins in a Clump | | | | | | | | | | | |
|---|---|---|---|---|---|---|---|---|---|---|---|---|
| 10 CLUMPS | (1, 1) | (12, 2) | (11, 3) | (10, 4) | (9, 5) | (8, 6) | (7, 7) | (6, 8) | (5, 9) | (4,10) | (3,11) | (2,12) |
| | (2, 1) | (1, 2) | (12, 3) | (11, 4) | (10, 5) | (9, 6) | (8, 7) | (7, 8) | (6, 9) | (5,10) | (4,11) | (3,12) |
| | (3, 1) | (2, 2) | (1, 3) | (12, 4) | (11, 5) | (10, 6) | (9, 7) | (8, 8) | (7, 9) | (6,10) | (5,11) | (4,12) |
| | (4, 1) | (3, 2) | (2, 3) | (1, 4) | (12, 5) | (11, 6) | (10, 7) | (9, 8) | (8, 9) | (7,10) | (6,11) | (5,12) |
| | (5, 1) | (4, 2) | (3, 3) | (2, 4) | (1, 5) | (12, 6) | (11, 7) | (10, 8) | (9, 9) | (8,10) | (7,11) | (6,12) |
| | (6, 1) | (5, 2) | (4, 3) | (3, 4) | (2, 5) | (1, 6) | (12, 7) | (11, 8) | (10, 9) | (9,10) | (8,11) | (7,12) |
| | (7, 1) | (6, 2) | (5, 3) | (4, 4) | (3, 5) | (2, 6) | (1, 7) | (12, 8) | (11, 9) | (10,10) | (9,11) | (8,12) |
| | (8, 1) | (7, 2) | (6, 3) | (5, 4) | (4, 5) | (3, 6) | (2, 7) | (1, 8) | (12, 9) | (11,10) | (10,11) | (9,12) |
| | (9, 1) | (8, 2) | (7, 3) | (6, 4) | (5, 5) | (4, 6) | (3, 7) | (2, 8) | (1, 9) | (12,10) | (11,11) | (10,12) |
| | (10, 1) | (9, 2) | (8, 3) | (7, 4) | (6, 5) | (5, 6) | (4, 7) | (3, 8) | (2, 9) | (1,10) | (12,11) | (11,12) |
| | (11, 1) | (10, 2) | (9, 3) | (8, 4) | (7, 5) | (6, 6) | (5, 7) | (4, 8) | (3, 9) | (2,10) | (1,11) | (12,12) |
| | (12, 1) | (11, 2) | (10, 3) | (9, 4) | (8, 5) | (7, 6) | (6, 7) | (5, 8) | (4, 9) | (3,10) | (2,11) | (1,12) |

| Layer 1 | Clump # | | | | | | | | | |
|---|---|---|---|---|---|---|---|---|---|---|
| Symbol # | 0 | 1 | 2 | 3 | 4 | 5 | 6 | 7 | 8 | 9 |
| 0 | 301 | 343 | 398 | 446 | 488 | 539 | 594 | 644 | 709 | 767 |
| 1 | 302 | 348 | 391 | 444 | 492 | 543 | 597 | 649 | 710 | 766 |
| 2 | 296 | 350 | 397 | 441 | 497 | 538 | 593 | 651 | 700 | 758 |
| 3 | 297 | 346 | 399 | 450 | 495 | 541 | 592 | 648 | 708 | 761 |
| 4 | 294 | 352 | 390 | 447 | 496 | 545 | 596 | 650 | 704 | 760 |
| 5 | 300 | 342 | 400 | 442 | 498 | 540 | 599 | 652 | 703 | 763 |
| 6 | 299 | 351 | 401 | 445 | 493 | 548 | 589 | 653 | 711 | 768 |
| 7 | 292 | 344 | 392 | 439 | 499 | 542 | 591 | 645 | 707 | 764 |
| 8 | 293 | 347 | 393 | 440 | 490 | 546 | 595 | 647 | 701 | 757 |
| 9 | 303 | 349 | 396 | 448 | 494 | 547 | 600 | 655 | 706 | 762 |
| 10 | 298 | 341 | 395 | 443 | 491 | 544 | 590 | 654 | 702 | 759 |
| 11 | 295 | 345 | 394 | 449 | 489 | 537 | 598 | 646 | 705 | 765 |

| Layer 2 | Clump # | | | | | | | | | |
|---|---|---|---|---|---|---|---|---|---|---|
| Symbol # | 0 | 1 | 2 | 3 | 4 | 5 | 6 | 7 | 8 | 9 |
| 0 | 297 | 352 | 401 | 449 | 488 | 540 | 595 | 649 | 707 | 759 |
| 1 | 296 | 346 | 400 | 443 | 489 | 545 | 591 | 644 | 711 | 762 |
| 2 | 295 | 343 | 397 | 439 | 490 | 543 | 596 | 655 | 708 | 768 |
| 3 | 299 | 344 | 396 | 441 | 495 | 546 | 598 | 650 | 702 | 766 |
| 4 | 294 | 342 | 392 | 446 | 492 | 548 | 600 | 651 | 701 | 765 |
| 5 | 302 | 350 | 390 | 448 | 491 | 541 | 589 | 646 | 703 | 757 |
| 6 | 301 | 348 | 399 | 440 | 494 | 538 | 599 | 654 | 704 | 764 |
| 7 | 300 | 351 | 393 | 444 | 497 | 542 | 590 | 648 | 706 | 767 |
| 8 | 298 | 345 | 391 | 445 | 499 | 539 | 592 | 647 | 700 | 763 |
| 9 | 292 | 347 | 395 | 450 | 496 | 547 | 594 | 652 | 705 | 758 |
| 10 | 293 | 349 | 394 | 447 | 498 | 544 | 597 | 653 | 709 | 761 |
| 11 | 303 | 341 | 398 | 442 | 493 | 537 | 593 | 645 | 710 | 760 |

FIG. 6

| Clump | 0 | 1 | 2 | 3 | 4 | 5 | 6 | 7 | 8 | 9 | 10 | 11 |
|---|---|---|---|---|---|---|---|---|---|---|---|---|
| Clump 0 | 6 | 5 | 1 | 0 | 4 | 7 | 3 | 9 | 10 | 11 | 8 | 2 |
| Clump 1 | 2 | 6 | 5 | 1 | 0 | 4 | 7 | 3 | 9 | 10 | 11 | 8 |
| Clump 2 | 11 | 8 | 2 | 6 | 5 | 1 | 0 | 4 | 7 | 3 | 9 | 10 |
| Clump 3 | 4 | 7 | 3 | 9 | 10 | 11 | 8 | 2 | 6 | 5 | 1 | 0 |
| Clump 4 | 0 | 4 | 7 | 3 | 9 | 10 | 11 | 8 | 2 | 6 | 5 | 1 |
| Clump 5 | 8 | 2 | 6 | 5 | 1 | 0 | 4 | 7 | 3 | 9 | 10 | 11 |
| Clump 6 | 9 | 10 | 11 | 8 | 2 | 6 | 5 | 1 | 0 | 4 | 7 | 3 |
| Clump 7 | 1 | 0 | 4 | 7 | 3 | 9 | 10 | 11 | 8 | 2 | 6 | 5 |
| Clump 8 | 10 | 11 | 8 | 2 | 6 | 5 | 1 | 0 | 4 | 7 | 3 | 9 |
| Clump 9 | 7 | 3 | 9 | 10 | 11 | 8 | 2 | 6 | 5 | 1 | 0 | 4 |

FIG. 8

| | | | | | | | | | | | | |
|---|---|---|---|---|---|---|---|---|---|---|---|---|
| CLUMP 0 | 0 | 1 | 2 | 3 | 4 | 5 | 6 | 7 | 8 | 9 | 10 | 11 |
| | 6 | 5 | 1 | 0 | 4 | 7 | 3 | 9 | 10 | 11 | 8 | 2 |
| | 7 | 4 | 6 | 2 | 0 | 10 | 3 | 9 | 5 | 11 | 1 | 8 |
| CLUMP 1 | 0 | 1 | 2 | 3 | 4 | 5 | 6 | 7 | 8 | 9 | 10 | 11 |
| | 2 | 6 | 5 | 1 | 0 | 4 | 7 | 3 | 9 | 10 | 11 | 8 |
| | 1 | 8 | 7 | 4 | 6 | 2 | 0 | 10 | 3 | 9 | 5 | 11 |
| CLUMP 2 | 0 | 1 | 2 | 3 | 4 | 5 | 6 | 7 | 8 | 9 | 10 | 11 |
| | 11 | 8 | 2 | 6 | 5 | 1 | 0 | 4 | 7 | 3 | 9 | 10 |
| | 9 | 5 | 11 | 1 | 8 | 7 | 4 | 6 | 2 | 0 | 10 | 3 |
| CLUMP 3 | 0 | 1 | 2 | 3 | 4 | 5 | 6 | 7 | 8 | 9 | 10 | 11 |
| | 4 | 7 | 3 | 9 | 10 | 11 | 8 | 2 | 6 | 5 | 1 | 0 |
| | 4 | 6 | 2 | 0 | 10 | 3 | 9 | 5 | 11 | 1 | 8 | 7 |
| CLUMP 4 | 0 | 1 | 2 | 3 | 4 | 5 | 6 | 7 | 8 | 9 | 10 | 11 |
| | 0 | 4 | 7 | 3 | 9 | 10 | 11 | 8 | 2 | 6 | 5 | 1 |
| | 8 | 7 | 4 | 6 | 2 | 0 | 10 | 3 | 9 | 5 | 11 | 1 |
| CLUMP 5 | 0 | 1 | 2 | 3 | 4 | 5 | 6 | 7 | 8 | 9 | 10 | 11 |
| | 8 | 2 | 6 | 5 | 1 | 0 | 4 | 7 | 3 | 9 | 10 | 11 |
| | 10 | 3 | 9 | 5 | 11 | 1 | 8 | 7 | 4 | 6 | 2 | 0 |
| CLUMP 6 | 0 | 1 | 2 | 3 | 4 | 5 | 6 | 7 | 8 | 9 | 10 | 11 |
| | 9 | 10 | 11 | 8 | 2 | 6 | 5 | 1 | 0 | 4 | 7 | 3 |
| | 11 | 1 | 8 | 7 | 4 | 6 | 2 | 0 | 10 | 3 | 9 | 5 |
| CLUMP 7 | 0 | 1 | 2 | 3 | 4 | 5 | 6 | 7 | 8 | 9 | 10 | 11 |
| | 1 | 0 | 4 | 7 | 3 | 9 | 10 | 11 | 8 | 2 | 6 | 5 |
| | 3 | 9 | 5 | 11 | 1 | 8 | 7 | 4 | 6 | 2 | 0 | 10 |
| CLUMP 8 | 0 | 1 | 2 | 3 | 4 | 5 | 6 | 7 | 8 | 9 | 10 | 11 |
| | 10 | 11 | 8 | 2 | 6 | 5 | 1 | 0 | 4 | 7 | 3 | 9 |
| | 6 | 2 | 0 | 10 | 3 | 9 | 5 | 11 | 1 | 8 | 7 | 4 |
| CLUMP 9 | 0 | 1 | 2 | 3 | 4 | 5 | 6 | 7 | 8 | 9 | 10 | 11 |
| | 7 | 3 | 9 | 10 | 11 | 8 | 2 | 6 | 5 | 1 | 0 | 4 |
| | 5 | 11 | 1 | 8 | 7 | 4 | 6 | 2 | 0 | 10 | 3 | 9 |

FIG. 9

| Layer 3 | Clump # | | | | | | | | | |
|---|---|---|---|---|---|---|---|---|---|---|
| Symbol # | 0 | 1 | 2 | 3 | 4 | 5 | 6 | 7 | 8 | 9 |
| 0 | 294 | 351 | 396 | 450 | 498 | 537 | 591 | 654 | 700 | 757 |
| 1 | 298 | 343 | 399 | 448 | 489 | 540 | 597 | 650 | 701 | 758 |
| 2 | 297 | 342 | 393 | 441 | 496 | 544 | 589 | 655 | 710 | 764 |
| 3 | 299 | 347 | 394 | 442 | 499 | 543 | 600 | 644 | 704 | 759 |
| 4 | 302 | 346 | 401 | 446 | 497 | 546 | 596 | 645 | 705 | 763 |
| 5 | 293 | 341 | 391 | 439 | 494 | 541 | 598 | 651 | 711 | 767 |
| 6 | 296 | 352 | 392 | 444 | 495 | 547 | 599 | 647 | 709 | 768 |
| 7 | 301 | 350 | 400 | 449 | 492 | 542 | 592 | 653 | 702 | 760 |
| 8 | 295 | 348 | 390 | 443 | 488 | 548 | 593 | 652 | 706 | 761 |
| 9 | 292 | 349 | 398 | 445 | 490 | 538 | 590 | 649 | 703 | 765 |
| 10 | 300 | 344 | 395 | 447 | 493 | 539 | 595 | 646 | 708 | 762 |
| 11 | 303 | 345 | 397 | 440 | 491 | 545 | 594 | 648 | 707 | 766 |

MULTIPLE SCRAMBLED LAYERS FOR AUDIO WATERMARKING

CROSS-REFERENCE TO RELATED APPLICATIONS

This patent arises from a continuation of U.S. patent application Ser. No. 17/079,896, now U.S. Pat. No. 11,636,864, filed on Oct. 26, 2020, which is a continuation of U.S. patent application Ser. No. 16/225,438, now U.S. Pat. No. 10,818,303, filed on Dec. 19, 2018. U.S. patent application Ser. No. 17/079,896 and U.S. patent application Ser. No. 16/225,438 are hereby incorporated by reference in their respective entireties.

FIELD OF THE DISCLOSURE

This disclosure relates generally to encoding audio signals, and, more particularly, to multiple scrambled layers for audio watermarking.

BACKGROUND

Media watermarking (e.g., such as audio watermarking, video watermarking, etc.) can be used to identify media, such as television broadcasts, radio broadcasts, advertisements (television and/or radio), downloaded media, streaming media, prepackaged media, etc. Media watermarks, such as audio watermarks, are also extensively used in both radio and television to identify the station or channel to which a receiver is tuned. Existing media watermarking techniques identify media by embedding one or more codes (e.g., one or more watermarks) conveying media identifying information and/or an identifier that may be mapped to media identifying information, into an audio and/or video component of the media. To identify watermarked media, the watermark(s) are extracted and, for example, decoded and/or used to access a table of reference watermarks that are mapped to media identifying information.

BRIEF DESCRIPTION OF THE DRAWINGS

FIG. 2 is a table of example watermark symbol pairs.

FIG. 3 is a table of the example watermark symbol pairs of FIG. 2 organized into example frequency clumps.

FIG. 6 is two tables for two example watermark layers showing example watermark symbols distributed in example frequency clumps.

FIG. 8 is a table showing shared frequency bins for the watermark layers of FIG. 6.

FIG. 9 is a table showing shared frequency bins for an example third watermark layer added to the example table of FIG. 8.

DETAILED DESCRIPTION

Figure 1:
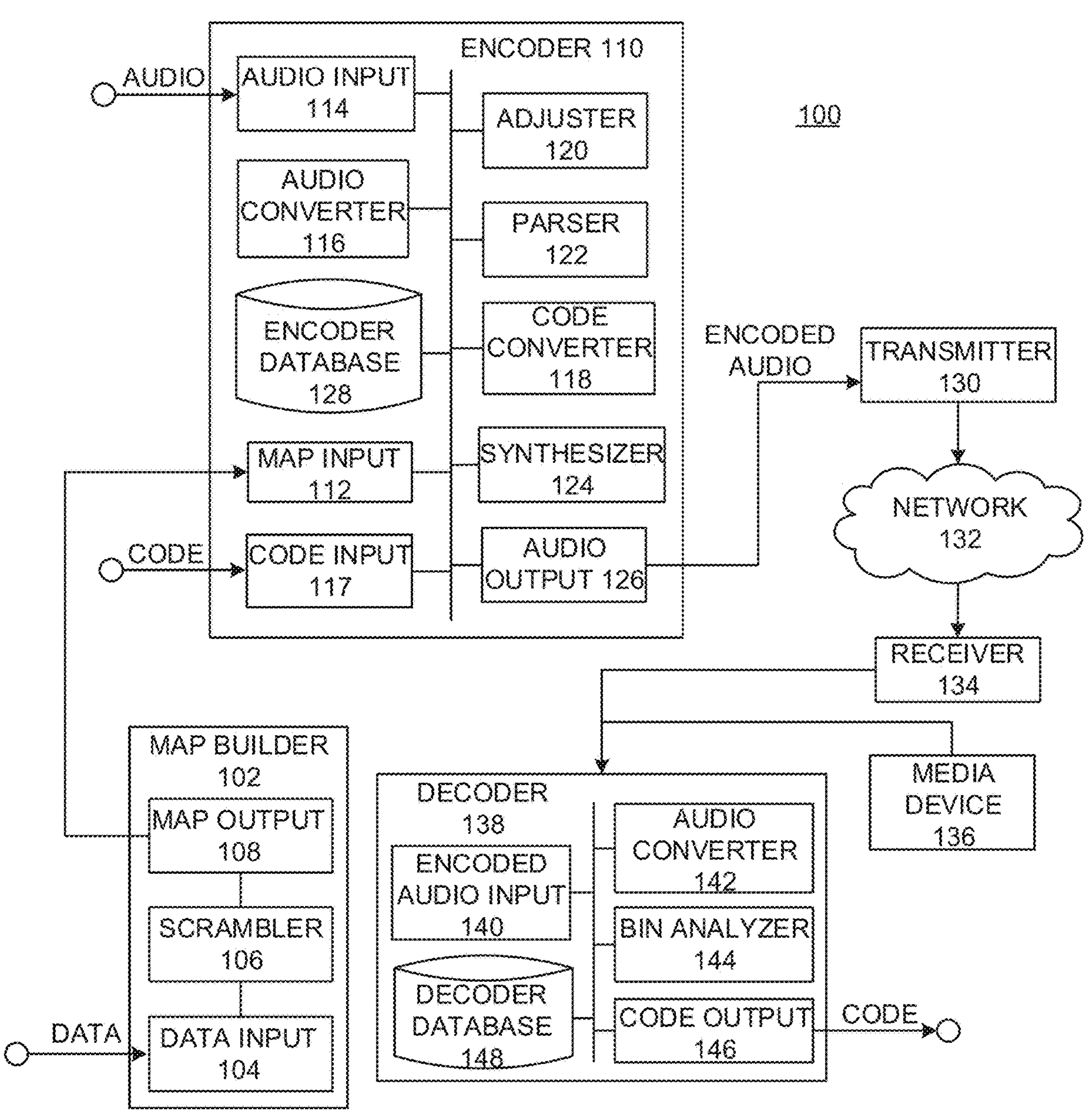
FIG. 1 is a block diagram of an example encoding system in accordance with teachings of this disclosure.

As noted above, media watermarking (e.g., such as audio watermarking, video watermarking, etc.) is used to identify media, such as television broadcasts, radio broadcasts, advertisements (television and/or radio), downloaded media, streaming media, prepackaged media, etc. Media watermarks, such as audio watermarks, are also extensively used in both radio and television to identify the station or channel to which a receiver is tuned. Existing media watermarking techniques identify media by embedding one or more codes (e.g., one or more watermarks) conveying media identifying information and/or an identifier that may be mapped to media identifying information, into an audio and/or video component of the media. In some examples, the audio or video component is selected to have a signal characteristic sufficient to hide the watermark.

As used herein, the term "media" refers to audio and/or visual (still or moving) content and/or advertisements. Furthermore, as used herein, the term "media" includes any type of content and/or advertisement delivered via any type of distribution medium. Thus, media includes television programming or advertisements, radio programming or advertisements, movies, web sites, streaming media, et.

As used herein, the terms "code" and "watermark" are used interchangeably and are defined to mean any identification information (e.g., an identifier) that may be inserted or embedded in the audio or video of media (e.g., a program or advertisement) for the purpose of identifying the media or for another purpose, such as tuning (e.g., a packet identifying header), copyright protection, etc. In some examples, to identify watermarked media, the watermark(s) are extracted and, for example, decoded and/or used to access a table of reference watermarks that are mapped to media identifying information.

For example, audio watermarks may be embedded at a broadcast facility and carry digital data in the form of symbols. In some applications, such as television audience measurement, a metering device installed in a panelist's home senses or otherwise captures audio emanating from, for example, a television (TV) set and/or other media device(s). The metering device performs signal processing operations on the audio to extract the watermark symbols representing digital data. In some examples, the data bits conveyed by the watermark symbols identify the TV station being received by the TV set, and may also represent a timestamp to further identify media (e.g., content and/or advertisements) being received. In the case of radio audience measurement, as well as in some television audience measurement examples, the metering device may be a portable device carried by the panelist to monitor media exposure in the home, as well as in other environments, such as an automobile. Media watermarks designed for radio broadcasts tend to be more robust than media watermarks designed for television broadcasts because radio broadcasts are often heard in environments characterized by relatively high ambient acoustic noise, such as in vehicles. For example, the data packets of media watermarks for radio broadcasts may be repeated multiple times to provide redundancy.

In the case of radio audience measurement, a widely used watermark is the Critical Band Encoding Technology (CBET) watermark invented by Jensen, et al. See U.S. Pat. Nos. 5,450,490 and 5,764,763. See also U.S. Pat. Nos. 6,845,360 and 6,871,180. In CBET watermarking, each data packet includes 32 bits of which 16 bits are used for station identification and the remaining 16 bits are used for a timestamp. CBET watermarking can also be used for television audience measurement.

CBET watermarks are constructed using symbols representing four bits of data. Each symbol is encoded in 400 milliseconds (ms) of host audio and is created by embedding a particular set of ten tones representing each symbol, with different sets of tones being used to represent different symbol values. Each tone belongs to a code band or frequency clump that includes several closely spaced frequencies of the audio. The code tones are in the frequency range 1 kilohertz (kHz) to 3 kHz in the case of CBET watermarking.

In some examples, to make these code tones imperceptible to the human ear, the amplitude of each of the tones is controlled by a "masking" energy offered by the host audio in a set of frequency bands (or code bands) in which these tones reside. Host audio that is rich in spectral energy in these code bands will support higher code tone amplitudes due to psycho-acoustic perception characteristics of the human ear. However, the masking characteristics do not remain constant across a 400 ms block of audio. In some examples, the masking characteristics are recalculated frequently at intervals as short as 2 ms.

Even with the resulting amplitude modulation of the code tones, the code tones can be successfully detected by signal processing techniques used for watermark detection, such as a Discrete Fourier Transform (DFT) performed on an audio block of 256 milliseconds lying anywhere within the 400-millisecond block of audio to determine the respective energies of the different frequencies, or tones, included in the audio. Each of the code tones included in the watermark symbol will tend to have significantly higher energy than other members of the code band associated with that tone. In some watermark detection procedures, the energy of each potential code tone of the audio is normalized relative to (e.g., divided by) the average energy in its code band. By adding the normalized energy of the set of code tones (e.g., all the ten tones) representing a symbol, a strength metric (or, in other words, a strength value) for the symbol may be determined. A winning symbol, representing the decoded watermark symbol, may be selected by comparing the strength metrics of all potential symbols and selecting the winning symbol to be the potential symbol with the largest strength metric. In some examples, the winning symbol is considered valid if its strength metric exceeds a threshold.

In radio audience measurement scenarios in which much of the listening occurs in a high ambient noise environment, such as a moving automobile, the energy of the embedded watermark tones is an important factor in the successful detection of the watermarks. Spectrally rich content, such as music, typically contains more masking energy across the ten code bands relative to content consisting of speech. To allow for these variations, the watermarks are generally repeated multiple times. For example, the CBET watermark message includes twelve symbols and the total duration is 12×0.4=4.8 seconds. In some such examples, the same watermark message, including station identification and timestamp, is repeated for an entire minute of audio. The detection process takes advantage of this redundancy, namely, every 400 ms block that is separated in time by 4.8 seconds is likely to carry the same symbol or, in other words, the same set of ten tones. The watermark symbol tone energies can be summed across blocks separated by 4.8 seconds to yield a significantly more robust watermark decoding result. Thus, in some such examples, even spectrally weak content, such as speech, yields a few detections every minute.

Thus, in some examples, the CBET watermark detection process performed in a metering device involves analyzing a block of audio samples corresponding to 256 ms to determine the presence of a valid CBET symbol. In general, the 400 ms symbol block boundaries are not known to the decoding process operating in the meter. Therefore, a scan operation that includes sliding a 256 ms window across the audio stream may be performed. This is usually performed in sliding increments that could be as large as 100 ms.

In some examples, an audio component of media (also referred to as the host audio) can carry multiple watermarks, which overlap in time, using frequency multiplexing. For example, CBET watermarking supports four layers in which each layer uses distinct sets of code tones to represent its associated symbols (e.g., with different layers using different sets of code tones). In some examples of CBET watermarking for radio, just one of these layers, which is called the local layer, is used for encoding watermarks. In some examples of CBET watermarking for television, such as examples in which networks deliver programs to local affiliates, two layers of watermarking, called the network layer and the local layer, are used for encoding watermarks.

In some audio watermarking solutions, watermarks are encoded into the audio signal by dividing the frequency range in which the watermark is to be embedded into a number of frequency clumps, with each frequency clump including a number of frequency bins. Each possible watermark symbol is assigned a unique combination of frequency bins containing one frequency bin per frequency clump. For example, the audio frequency range can be divided into ten frequency clumps each with twelve frequency bins. In such an example, a given watermark symbol is assigned ten frequency bins, one from each frequency clump. In some examples, multiple watermarking layers can be defined, as disclosed above, with each watermarking layer defined such that no symbols from different watermarking layers share the same combination of frequency bins across the frequency clumps. However, given the finite numbers of frequency bins and frequency clumps, watermark symbols in different watermarking layers may share some frequency bins in common.

The example apparatus, systems, methods, and articles of manufacture disclosed herein implement techniques to assign frequency bins to represent watermark symbols such that any group of N symbols from N watermarking layers, with one watermark symbol from each watermark layer, share at most N−1 frequency bins in common. For example, the example apparatus, systems, methods, and articles of manufacture disclosed herein ensure that, for watermarking in two watermark layers, any pair of watermark symbols from the pair of watermark layers share at most one frequency bin in common. As another example, the example apparatus, systems, methods, and articles of manufacture disclosed herein ensure that, for watermarking in three watermark layers, any trio of watermark symbols from the three watermark layers share at most two frequency bins in common. Reducing the number of shared frequency bins for watermark symbols in different watermark layers increases the detection distance between the watermarking layers, thereby reducing the probability of watermark detection errors. Reduced errors in watermark detection enhances the quality and accuracy of the media information deduced or extracted from the detected watermarks.

FIG. 1 is a block diagram of an example system 100 in accordance with the teachings of this disclosure. The example system 100 can encode multiple scrambled watermark layers into audio signals and decode the encoded signals. The example system 100 FIG. 1 includes an example map builder 102 that includes an example data input 102, an example scrambler 106, and an example map output 108.

The example system 100 also include an example encoder 110, which includes an example map input 112, an example audio input 114, an example audio converter 116, an example code input 117, an example code converter 118, an example adjuster 120, an example parser 122, an example synthesizer 124, an example audio output 126, and an example encoder database 128

The example system 100 also includes an example transmitter 130, an example network 132, an example receiver 134, an example media device 136, and an example decoder 138. The example decoder 138 an example encoded audio input 140, an example audio converter 142, and example bin analyzer 144, and example code output 146, and an example decoder database 148.

The example system 100 may be, for example, incorporated into an audience measurement system. The map builder 102 maps a distribution scheme for encoding an audio signal with a watermark. The data input 104 of the map builder 104 receives data and instructions for mapping the distribution scheme. For example, the data input 104 receives details related to characteristics of the signals to be encoded including, for example, frequency information. The data input 104 also receives information related to the watermarks to be encoded including, for example, the watermark symbols, the number of watermark layers, etc. The data input 104 also receives instructions from an operator related to the building of the distribution scheme.

The map builder 102 also includes the scrambler 106 which builds the distribution scheme. For example, the scrambler 106 divides the watermark to be encoded into the audio signal into a plurality of watermark symbols. In some examples, the data input 104 receives a watermark already divided into component watermark symbols. The scrambler 106 distributes, by mapping, the watermark symbols to a plurality of frequency bins in a plurality of frequency clumps of the audio signal according to create a first watermark layer having a first combination of the frequency bins and a second watermark layer having a second combination of the frequency bins. In some examples, the first combination of the frequency bins and the second combination of the frequency bins partially overlap. The scramble also determines a sequence for shifting watermark symbols between bins and creates a mapping to show the shifting of the watermark symbols in accordance with the sequence.

The scrambler 106 determines the sequence for shifting the watermark symbols among the frequency bins so as to minimize the sharing of the frequency bins between sets of watermark symbols across the watermark layers. The minimization of frequency bin sharing maximizes frequency bin distance. In some examples, the scrambler 106 creates the sequence to assign frequency bins for the watermark symbols such that any combination or group of N symbols from N watermarking layers, with one watermark symbol from each watermark layer, share a maximum of N−1 frequency bins in common.

In some examples, as disclosed further herein, the scrambler 106 establishes, creates, generates, or develops multiple sequences that are used to shift, rotate, and/or reorganize multiple watermark symbols, frequency bins, and/or clumps to generate the distribution scheme. In some examples, the scrambler 106 implements processing means. The processing means may be implemented by a processor such as the processor of FIG. 15 executing instructions such as the instructions of FIG. 13.

The example map builder 102 also includes the map output 108, which may be for example, a transceiver, to communicate distribution scheme to another device. For example, the map builder 102 communicates the distribution scheme to the encoder 110 via the map output 108. In some examples, the map output 108 implements means for communicating. The means for communicating may be implemented by a processor such as the processor of FIG. 15 executing instructions such as the instructions of FIG. 13.

The encoder 110 adds a code or watermark to an audio signal to produce an encoded audio signal in accordance with the distribution scheme. The map input 112 of the encoder 110 receives information for use in the encoding process. For example, the map input 112 receives the distribution scheme mapped by the builder 102. In addition, the audio input 114 receives the audio signal(s) that are to be encoded and the watermark(s) to encode in the signal(s). The audio signal(s) may be any form of audio including, for example, voice, music, noise, commercial advertisement audio, or audio associated with a television program, a radio program, or any other audio related media. The code input 117 receives the codes or watermarks to be added to the audio signal. The watermark(s) to be inserted into the audio signal is inaudible or substantially inaudible. In some examples, the map input 112, audio input 114, and/or the code input 117 includes a wired receiver. In other examples, the map input 112, audio input 114, and/or the code input 117 includes a wireless receiver.

The encoder 110 includes the audio converter 116. In some examples, the audio converter 116 converts the audio signal into frequency components, for example, by Fast Fourier Transform (FFT), wavelet transform, or other time-to-frequency domain transformation. The encoder 110 also includes the coder converter 118, which transform the code or watermarks to the frequency domain. The adjuster 120 adjusts the frequency amplitudes of the audio signal. In some examples, the frequency is adjusted based on the frequencies of the code output by the code converter 118.

The encoder 110 includes the parser 122. The parser 122 divides the audio signal into a plurality of frequency clumps with a plurality of frequency bins in the plurality of frequency clumps. The energy of the frequency bins may be adjusted by the adjuster 120 based on the frequencies of the code. The parser 122 also divides the watermark into a plurality of watermark symbols. The parser 122 distributes the watermark symbols to the plurality of frequency bins in the plurality of frequency clumps according to the distribution scheme mapped by the map builder 102. The distribution of the watermark symbols can be done to create multiple watermark layers, as disclosed above. For example, the parser 122 can distribute the watermark symbols into N number of watermark layers. The watermark layers have individual distributions of watermark symbols across the frequency bins. In some examples, a first watermark layer has watermark symbols distributed to a first combination of the frequency bins, and a second watermark layer has watermark symbols distributed to a second combination of the frequency bins. In some examples, the first combination of the frequency bins and the second combination of the frequency bins partially overlap.

Also, in some examples, the parser 122 distributes the watermark symbols to the plurality of frequency bins in the plurality of frequency clumps to create a third watermark layer that has watermark symbols distributed to a third combination of the frequency bins, the third combination of the frequency bins at least partially overlapping with the first combination of the frequency bins and the second combination of the frequency bins. Other numbers of watermark layers may be created. The different layers could be used for included different codes or watermarks in the audio signal. In some examples, the parser 122 implements means for dividing an audio signal and/or means for dividing and/or distributing a watermark, which may be implemented by a processor such as the processor of FIG. 15 executing instructions such as the instructions of FIG. 14.

The synthesizer 124 synthesizes or generates an encoded audio signal with the watermark symbols distributed in the audio signal in the distribution scheme created by the scrambler 106. The synthesizer 124 may combine the audio signal and the watermark(s) in an analog or digital form. If the synthesizer 124 performs a digital combination, the audio signal and the watermark(s) may be combined with the sine waves in digital form. Alternatively, the combination may be carried out in the frequency domain, wherein frequency coefficients of the audio signal are adjusted in accordance with frequency coefficients representing the sine waves. As a further alternative, the sine waves and the audio signal may be combined in analog form. In some examples, the synthesizer 124 implements means for synthesizing. The means for synthesizing may be implemented by a processor such as the processor of FIG. 15 executing instructions such as the instructions of FIG. 14.

The audio converter 116 converts the encoded audio signal synthesized by the synthesizer 124 from the frequency domain to the time domain. The audio output 126 outputs the encoded audio signal. The encoded audio may be output from the audio output 114 in analog or digital form. The encoder 110 also includes the encoder database 128 to store data related to the operation of the encoder 110 and its component parts. For example, an optimal distribution scheme and/or the one or more sequences outlined in the mapped distribution scheme by the scrambler 106 of the map builder 102 are saved for future reference or use. Other examples of an encoder are disclosed in U.S. Pat. No. 6,421,445, which is hereby incorporated by reference in its entirety.

The transmitter 130 transmits the encoded audio signal from the encoder 110 for use by an audience measurement entity, broadcaster, and/or media company. The encoded audio signal is communicated via the network 132, which may include cable, satellite, Internet, and/or broadcast communications.

The receiver 134 receives the encoded audio signal transmitted over the network 132. The media device 136 is communicatively coupled to the receiver 134 and obtains the audio signal for playback. The media device 136 may include a television, computer, radio, smartphone, and/or other device suitable for playing an audio signal. In some examples, the code is inaudible to humans. In some examples, the receiver 134 is incorporated into the media device 136.

The decoder 138 is also communicatively coupled to the receiver 134. In some examples, the receiver 134 is incorporated into the decoder 138. In some examples, the decoder 138 is incorporated into the media device 136. In other examples, the decoder 138 is separate from the media device 136. The encoded audio input 140 receives or accesses the encoded audio signal. In some examples, the decoder 138 receives the encoded audio directly from the receiver 134 by, for example, a wired connection. In some examples, the decoder 138 receives the encoded audio signal from the media device 136. In some examples, the audio input 140 includes a microphone that detects the audio signal. The audio converter 142, which may be the same structure as the audio converter 116 of the encoder 110, converts the encoded audio signal from the time domain to the frequency domain as disclosed above. The bin analyzer 144 analyzes the frequency components of the encoded audio signal and extracts the code from the audio signal. The code output 146 transmits the extracted code. As disclosed above, the code may be used, for example, by audience measurement entities to gather information about and/or from the audio signal and related programming, transmission, environment, etc.

FIGS. 2-11 show example details related to the operation of the scrambler 106 to develop the distribution schemes. FIG. 2 is a table of example watermark symbol pairs. In this example, the watermark symbols from two watermark layers are distributed into frequency bins. In this example, there are two watermark layers and each layer includes twelve watermark symbols. FIG. 2 shows every combination of each watermark symbol from each watermark layer being paired with each watermark symbol from the other watermark layer. Thus, there are 144 possible combinations (12×12=144).

In FIG. 2, the cell or frequency bin in the top row and left column includes watermark symbol 1 from the first watermark layer and watermark symbol 1 from the second watermark layer. The frequency bin in the second row from the top and the left column includes watermark symbol 2 from the first watermark layer and watermark symbol 1 from the second watermark layer. The frequency bin in the top row and the second column to the left includes watermark symbol 1 from the first watermark layer and watermark symbol 2 from the second watermark layer. And so forth.

In some examples, there are ten frequency clumps with twelve frequency bins per frequency clump. The scrambler 106 puts the watermark symbols from the two watermark layers into 120 frequency bins (12×10=120). Each watermark layer has twelve watermark symbols so that each watermark symbol has its own frequency bin in a frequency clump but for two watermark layers that have to share. The scrambler 106 minimizes frequency bin sharing for any pair of watermark symbols from the two watermark layers. For example, if a pair of watermark symbols shares a frequency bin in a first frequency clump, the scrambler 106 makes sure that the same pair of watermark symbols do not share any other frequency bin. Otherwise, these two watermark symbols will be too close and one can impede detection of the other. In addition, the scrambler 106 establishes many variations or distributions of watermark symbols so that there are multiple candidate distributions for use by the encoder 110.

In this example, the scrambler 106 takes all watermark symbol pairs (one watermark symbol from each watermark layer) and distribute them through all available frequency bins. As noted above, the total number of watermark symbol pairs from two watermark layers with twelve symbols each is 144 (12×12=144). But in this example, the total number of frequency bins is 120, which is fewer. In this example, 24 watermark symbol pairs (144−120=24) will not have any shared bins, while the 120 remaining watermark symbol pairs will have only one bin shared.

FIG. 3 is a table of the example watermark symbol pairs of FIG. 2 organized into example frequency clumps. The table of FIG. 3 is the result of transforming the table of FIG. 2 by designating each row as a frequency clump and each column as frequency bins in a frequency clump. Because in this example, there are only ten frequency clumps, a line is drawn (between row 10 and row 11) to separate the watermark symbols that are placed in frequency clumps and, thus, are used from the watermark symbol pairs that are unused. Thus, FIG. 3 shows the distribution of 144 watermark symbol pairs to 120 frequency bins.

Figures 4, 5:
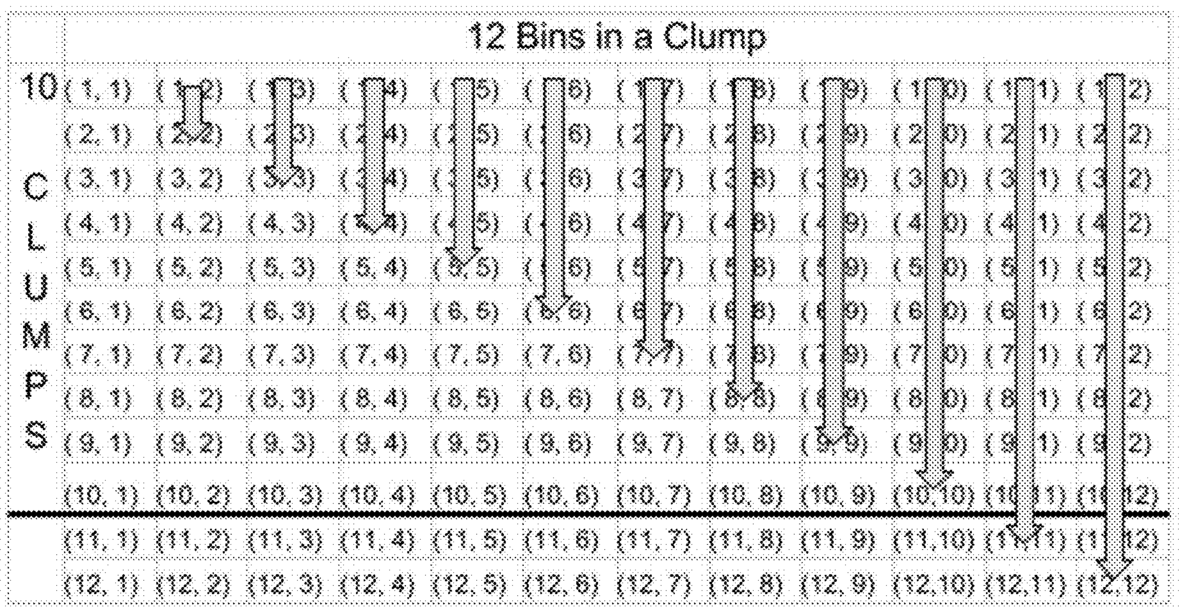
FIG. 4 is a table showing an example shift of the watermark symbol pairs of FIG. 3.
FIG. 5 is a table showing the results of the example shift of FIG. 4.

The scrambler 106 recognizes a problem: in frequency clump 1 (row 1), there are twelve frequency bins occupied by different symbols from watermark layer 2 (right indices) but by the same watermark symbol 1 from watermark layer 1 (left indices). Each watermark symbol of a watermark layer is supposed to appear in only one frequency bin per frequency clump. The scrambler 106 addresses this issue by setting or establishing a sequence or index for shifting or rotating one or more of the watermark symbols, frequency bins, frequency clumps, etc. In this example, the scrambler 106 establishes a rotation index or sequence to shift the columns progressively as shown in FIG. 4. The sequence includes shifting the watermark symbols of the first watermark layer and the second watermark layer distributed to a first frequency bin in a first clump to a second frequency bin in a second clump to generate a second distribution scheme.

As shown in FIG. 4, the frequency bins in the first column are not shifted or rotated. In column 2, the frequency bins are all shifted or rotated down one row or rotated to the next frequency clump. In column 3, the frequency bins are all shifted or rotated down two row or rotated down two frequency clumps. Thus, the shift in column 2 is a first distance, and the shift in column 3 is a second distance, different than the first distance. The shift continues progressively with each adjacent column to the right shifted more than the prior column to the left. Thus, each adjacent column to the right is shifted by a greater distance than the prior column to the left. FIG. 5 is a table showing the results of the example shift of FIG. 4.

With the table of FIG. 5, the scrambler 106 has satisfied two conditions for both of the watermark layers: (1) all watermark symbols appear only once in each frequency clump (row); and (2) any watermark symbol pair from the two watermark layers has only one shared frequency bin or has no shared frequency bins if the watermark symbol pair is unused (the unused pairs appears below the thick black line of FIG. 5). The scrambler 106 satisfies the second condition by the design of the table. In addition, the scrambler 106 satisfies the first condition 1 after the progressive rotation or sequence of shifting.

FIG. 5 represents an example distribution scheme mapped by the scrambler 106 to minimize frequency bin sharing between two watermark layers. The encoder 110 can further use the part of the table of FIG. 5 that includes the used frequency clumps (i.e., that portion above the thick black line) and translate the table to two watermark symbol/frequency clump tables, one for each watermark layer.

In other examples, the scrambler 106 can provide more variations of the same table while continuing to satisfy conditions (1) and (2). Thus, the scrambler 106 can provide more sequences for shifting and rotating the watermark symbol pairs, frequency bins, frequency clumps, etc. to generate or establish distribution schemes with more randomness in watermark symbol distribution through the frequency bins.

For example, in some examples, the scrambler 106 creates a sequence that shuffles one or more of the cells within any of the rows. In this example, the scrambler 106 satisfies conditions 1 and 2.

In some examples, the scrambler 106 creates a sequence swaps of any two rows. In this example, the scrambler 106 satisfies conditions 1 and 2.

Also, the progressive rotation of columns shown in FIG. 4 is only one example for shifting or rotating columns. In some examples, the scrambler shifts or rotates the columns in a random order. For example, consider the numbers from 0 to 11 in sequence: [0, 1, 2, 3, 4, 5, 6, 7, 8, 9, 10, 11]. The progressive rotation of FIG. 4 shifting the columns in this sequence. The first column had no rotation (0), the second column had rotation by one cell (1), and so on (2, 3, 4, 5, 6, 7, 8, 9, 10, 11). In other examples, the scrambler 106 can create a sequence for shifting or a rotation index based on a shuffling of these numbers, for example: [8, 11, 2, 7, 5, 4, 6, 3, 0, 9, 10, 1]. The scrambler 106 then shifts the columns in accordance with this sequence. Thus, the first column is rotated by eight cells (8), the second column is rotated by eleven cells (11), and so on (2, 7, 5, 4, 6, 3, 0, 9, 10, 1). Any column rotation that is different for different columns will work. The resulting table will satisfy conditions 1 and 2.

In some examples, the scrambler 106 uses the algorithm:

1) randomly shuffle the numbers 0-11 into a first sequence and rotate the column in accordance with that second sequence;
2) randomly shuffle the numbers 0-11 into a second sequence and move entire rows in accordance with that second sequence; and
3) randomly shuffle the numbers 0-11 into a third sequence and arrange cells in each row accordingly (which is be repeated for each row).

Thus, the scrambler 106 establishes fourteen sequences of twelve numbers and apply them to column rotation, rows arrangement, and cells arrangement in each row. With this algorithm, the scramble 110 develops multiple sequence and distribution scheme candidates that all satisfy conditions 1 and 2.

Figure 7:
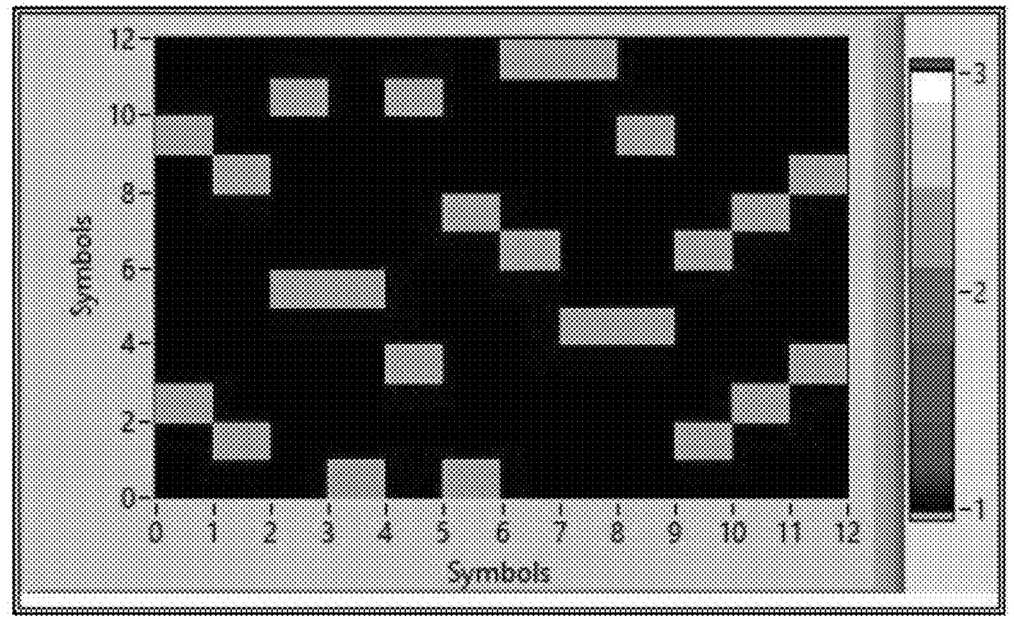
FIG. 7 is a schematic illustration of shared frequency bins for the watermark layers of FIG. 6.

FIG. 6 shows two example watermark layers showing example watermark symbols distributed in example frequency clumps in accordance with an optimized distribution scheme. In FIG. 6, the two watermark layers are shown in separate tables. The watermark symbols are shown in the frequency clump and frequency bin distribution, where the cells in the columns under the frequency clump numbers are frequency bins. For example, in watermark layer 1, watermark symbol 0 appears in frequency bin 301 of frequency clump 0. In watermark layer 2, watermark symbol 6 also appears in frequency bin 301 of frequency clump 0. In the example of FIG. 6, the watermark symbol distribution for the first watermark layer and the second watermark layer is optimized to reduce the number of shared frequency bins for pairs of watermark symbols from different watermark layers. FIG. 7 provides a visualization of the optimized distribution. In FIG. 7, all possible watermark symbol pairs are placed into a 12×12 matrix. The color of the cells in FIG. 7 for the watermark symbol pairs represented the number of frequency bins shared by the watermark symbol pair. FIG. 7 shows that the maximum number of shared frequency bins is one, which is represented by the color black. The lighter color shows that there are no shared frequency bins for the pair of watermark symbols.

As noted above, in some examples, there are additional watermark layers such as, for example, a third watermark layer. In such examples, the scrambler 106 transforms the watermark layer distribution shown in FIG. 1 into the table of FIG. 8. The scrambler 106 creates the table of FIG. 8 by following the frequency bin numbers in both tables of FIG. 6. For example, in watermark layer 1, for watermark symbol 0 in frequency clump 0, the frequency bin number is 301. For watermark layer 2 in the same frequency clump 0, the frequency bin number belongs to watermark symbol 6. Therefore, the first pair of watermark symbols is 0 and 6, as shown in FIG. 8. Thus, the top row in a frequency clump in FIG. 8 corresponds to the first watermark layer, and the bottom row in a frequency clump in FIG. 8 corresponds to the second watermark layer. The scrambler 106 continues to arrange all of the frequency clumps in FIG. 8 in accordance with the watermark symbol pairing per frequency bin of FIG. 6.

The watermark symbols are arranged in sequence 0-11 for watermark layer 1 in each frequency clump. The watermark symbols for watermark layer 2 are not arranged in numerical order. Rather, in watermark layer 2, the watermark symbols are randomly sequenced. In this example, the sequence is 6, 5, 1, 0, 4, 7, 3, 9, 10, 11, 8, 2, but the sequence is shifted or rotated per frequency clump. Note that the watermark symbols for watermark layer 2 in frequency clump 1 is shifted one cell relative to the positions of watermark layer 1. Frequency clump 2 has the watermark symbols in watermark layer 2 shifted three cells relative to the positions of watermark layer 1. The shifts for all the frequency clumps for watermark layer 2 are:

TABLE 1

| | Shifts of Watermark Layer 2 Relative to Watermark Layer 1 |
|---|---|
| Frequency Clump 0 | 0 |
| Frequency Clump 1 | 1 |
| Frequency Clump 2 | 3 |
| Frequency Clump 3 | 8 |
| Frequency Clump 4 | 9 |
| Frequency Clump 5 | 2 |
| Frequency Clump 6 | 5 |
| Frequency Clump 7 | 10 |
| Frequency Clump 8 | 4 |
| Frequency Clump 9 | 7 |

The shifts are all different, which is the result of the operation of the scrambler 106 as disclosed above in connection with FIGS. 3-5.

The scrambler 106 then adds the third watermark layer by randomly selecting ten different shifts from twelve numbers (i.e., number 0-11). The scrambler 106 is to select ten shifts for watermark layer 3 that are also different than the shifts for watermark layer 2.

TABLE 2

| | Shifts of Watermark Layer 3 Relative to Watermark Layer 1 |
|---|---|
| Frequency Clump 0 | 4 |
| Frequency Clump 1 | 6 |
| Frequency Clump 2 | 7 |
| Frequency Clump 3 | 8 |
| Frequency Clump 4 | 3 |
| Frequency Clump 5 | 10 |
| Frequency Clump 6 | 1 |
| Frequency Clump 7 | 11 |
| Frequency Clump 8 | 2 |
| Frequency Clump 9 | 9 |

With different shifting, the scrambler 106 ensures that each pair of watermark symbols from watermark layer 1 and watermark layer 3 and each pair of watermark symbols from watermark layer 2 and watermark layer 3 are all unique. In addition, because all watermark symbol pairs belong to unique frequency bins, the scrambler 106 ensures that the maximum number of shared frequency bins is one, as shown in FIG. 7.

To determine that the shifts of watermark layer 2 are different than the shifts of watermark layer 3, the scrambler 106 takes the differences modulo 12 between shifts for watermark layer 2 and the shifts for watermark layer 3 to verify that the shifts are all different. For example:

TABLE 3

| | Shifts of Watermark Layer 2 Relative to Watermark Layer 1 | Shifts of Watermark Layer 3 Relative to Watermark Layer 1 | Subtraction Modulo 12 of the Two Shifts |
|---|---|---|---|
| Frequency Clump 0 | 0 | 4 | 4 |
| Frequency Clump 1 | 1 | 6 | 5 |
| Frequency Clump 2 | 3 | 7 | 4 |
| Frequency Clump 3 | 8 | 8 | 0 |
| Frequency Clump 4 | 9 | 3 | |
| Frequency Clump 5 | 2 | 10 | |
| Frequency Clump 6 | 5 | 1 | |
| Frequency Clump 7 | 10 | 11 | |
| Frequency Clump 8 | 4 | 2 | |
| Frequency Clump 9 | 7 | 9 | |

Without doing all subtractions between the two sets of shifts, the scrambler 106 already determined by frequency clump 2 that the number 4 is repeated. Therefore, the random selection of shifts for watermark layer 3 does not satisfy the condition of having unique shifts for watermark layer 2 compared to watermark layer 3. The scrambler 106 then generates an addition sequence of ten random different numbers out of twelve possible numbers so that the differences with the shifts for watermark layer 2 and watermark layer 3 are all different. With twelve numbers, the scrambler 106 can produce 239,500,800 different sequences (12!/2!=239,500,800).

The scrambler 106 tests the different combinations and selects a sequence in which there is a unique set of differences between watermark layer 2 and watermark layer 3. In some examples, about 280 combination per 100,000 trials produces a unique set of differences to satisfy this condition. For example:

TABLE 4

| | Shifts of Watermark Layer 2 Relative to Watermark Layer 1 | Shifts of Watermark Layer 3 Relative to Watermark Layer 1 | Subtraction Modulo 12 of the Two Shifts |
|---|---|---|---|
| Frequency Clump 0 | 0 | 0 | 0 |
| Frequency Clump 1 | 1 | 2 | 1 |
| Frequency Clump 2 | 3 | 5 | 2 |
| Frequency Clump 3 | 8 | 11 | 3 |
| Frequency Clump 4 | 9 | 1 | 4 |
| Frequency Clump 5 | 2 | 7 | 5 |
| Frequency Clump 6 | 5 | 3 | 10 |
| Frequency Clump 7 | 10 | 6 | 8 |
| Frequency Clump 8 | 4 | 10 | 6 |
| Frequency Clump 9 | 7 | 4 | 9 |

With a sequence identified for the shift for watermark layer 3, the scrambler 106 distributes watermark symbols of the third watermark layer 3 to the frequency clumps. An example distribution of watermark layer 3 is shown in FIG. 9. The scrambler 106 may randomly and/or arbitrarily select the sequence of the watermark symbols of watermark layer 3. In this example, the sequence is 7, 4, 6, 2, 0, 10, 3, 9, 5, 11, 1, 8. The shifts for watermark layer 2 and watermark layer 3 are unique, as shown in Table 4.

Figures 10, 11:
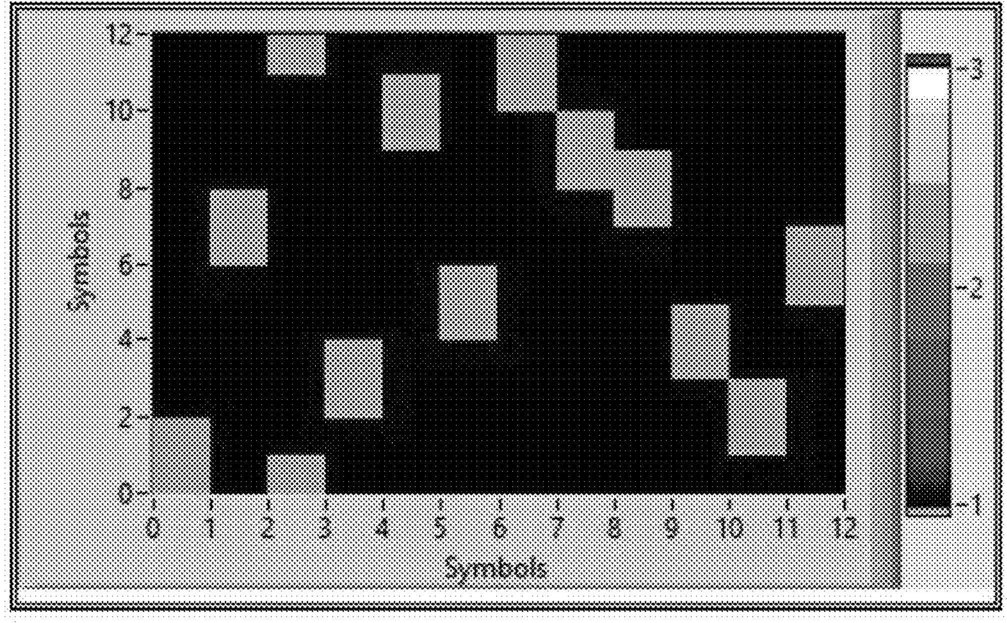
FIG. 10 is a table showing example watermark symbols for the example third layer of FIG. 9 distributed in the example frequency clumps of FIG. 6.
FIG. 11 is a schematic illustration of shared frequency bins for the first watermark layer and the third watermark layer of FIG. 9.

The scrambler 106 uses the distribution of FIG. 9 and the data from FIG. 6 to recover the frequency bins for the watermark symbols of the watermark layer 3. FIG. 10 is a table showing example watermark symbols for the example third layer of FIG. 9 distributed in the example frequency clumps of FIG. 6.

Figure 12:
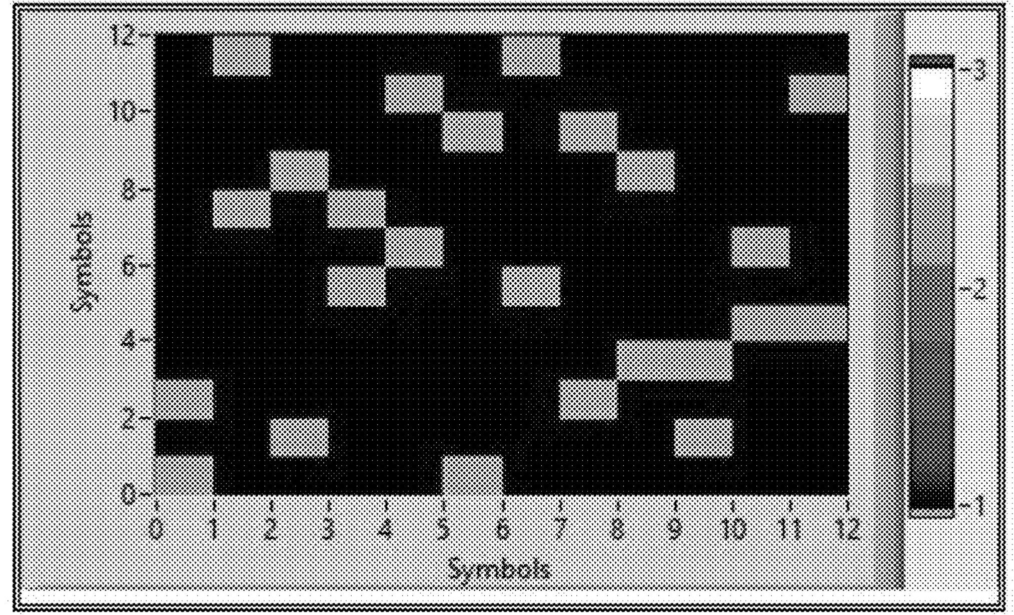
FIG. 12 is a schematic illustration of shared frequency bins for the second watermark layer and the third watermark layer of FIG. 9.

In the example of FIGS. 6, 9, and 10, the watermark symbol distribution for watermark layer 1, watermark layer 2, and watermark layer 3 is optimized to reduce the number of shared frequency bins for pairs of watermark symbols from different watermark layers. These distribution schemes can be transmitted to the encoded 102 for use in encoding audio signals. FIGS. 11 and 12 provide a visualization of the optimized distribution. In FIGS. 11 and 12, all possible watermark symbol pairs are placed into a 12×12 matrix. The color of the cells in FIGS. 11 and 12 for the watermark symbol pairs represented the number of frequency bins shared by the watermark symbol pair. FIG. 11 is a schematic illustration of shared frequency bins for the first watermark layer and the third watermark layer of FIG. 9. FIG. 12 is a schematic illustration of shared frequency bins for the second watermark layer and the third watermark layer of FIG. 9.

FIGS. 11 and 12 show that the maximum number of shared frequency bins is one, which is represented by the color black. The lighter color shows that there are no shared frequency bins for the pair of watermark symbols. With different shifting, the scrambler 106 ensures that each pair of watermark symbols from watermark layer 1 and watermark layer 3 and each pair of watermark symbols from watermark layer 2 and watermark layer 3 are all unique. In addition, because all watermark symbol pairs belong to unique frequency bins, the scrambler 106 ensures that the maximum number of shared frequency bins is one, as shown in FIGS. 11 and 12. The pictures of FIGS. 11 and 12 confirm that the scrambler created an optimal third watermark layer from the first and second watermark layers. In this example, the third watermark layer does not have more than one frequency bin shared with either the first watermark layer or the second watermark layer.

In some examples, the scrambler 106 continues and creates a fourth watermark layer and/or additional watermark layers. In addition, in some examples, the second watermark layer can be generated by the scrambler 106 in the same manner as the generation of the third watermark layer discussed in connection with FIGS. 6-12. In such examples, the scrambler starts with an ordered watermark symbol sequence as opposed to starting with ordered frequency bins, as the scrambler 106 did with the second watermark layer generation disclosed above with connection with FIGS. 2-5. In the example of FIG. 6-12, the scrambler 106 shuffles frequency bins to create a final layer definition table (FIG. 9). In the example of FIGS. 2-5, the scrambler 106 shuffles watermark symbol pairs to create a final layer definition table (FIG. 5).

In some examples, the scrambler 106 produces multiple watermark layer pairs that can be filtered for a minimum number of shared frequency bins (i.e., a one-bin away distance between watermark symbol pairs) in accordance with additional or alternative methods. In these examples, with two optimized watermark layers, a number of third watermark layer candidates can be generated that have an optimal zero-bin away distance. The third watermark layer candidates can be filtered for a desired one-bin away characteristics. The three watermark layers with optimal zero-bin away characteristics can be generated simultaneously or successively, by applying different criteria for optimization of the watermark layers.

In FIG. 8, above, the scrambler 106 has established a relationship between two watermark layers that has the optimal zero-bin away relationship. As shown in FIG. 8, in any given row (frequency clump), the rows of watermark layer 2 are a reordering of rows of watermark layer 1. In addition, in any given row (frequency clump), the sequence applied to the watermark layer 1 row (to produce the corresponding watermark layer 2 row) is a uniquely shifted version of the same reordering sequence applied in all other rows. That is the shift is unique across the ten frequency clumps. Thus, there are two sequences applied to watermark layer 1 to produce watermark layer 2: (sequence 1) one sequence of length twelve is applied to each row; and (sequence 2) one sequence of length ten (from a range 0-11 or 1-12) applied as shift to sequence 1 in each row (frequency clump). The twelve members of sequence 1 are unique (there are no repeated members), and the ten members of sequence 2 are also unique (there are no repeated members).

In addition, the scrambler 106 generates the third watermark layer, as disclosed above, with an additional shift sequence (sequence 3) of length ten (derived from range 0-11 or 1-12). The third sequence has ten unique members (there are no repeated members). The third sequence also has ten unique differences with the shift sequence for the watermark layer 2 (sequence 2). Thus, as disclosed above, in some examples, the scrambler 106 generates two optimal watermark layers. The scrambler 106 also deduces sequence 1 and sequence 2 from the relationship between watermark layer 1 and watermark layer 2 and generates sequence 3 that meets the constraints disclosed above. The scrambler uses sequence 3 to create the watermark layer 3.

In another example, the scrambler 106 generates two sequences—sequence 1 with twelve unique members and sequence 2 with ten 10 unique members. Both sequences have a range of 0-11 or 1-12. The scrambler generates sequence 3 with ten unique members and 10 unique differences with corresponding members of sequence 2. The scrambler 106 generates the frequencies of watermark layer 2 using sequence 1 and sequence 2. Thus, for each of ten clumps, the scrambler 106 computes or establishes a 12-length "rotatedIndex" sequence that is the modulo 12 sum of one member of sequence 2 and all twelve members of sequence 1. In addition, the scrambler populates the 12 symbols of the watermark layer 2 in the frequency clumps in sequence 1 to 12 by reading out members of the corresponding watermark layer 1 frequency clump using the sequence, rotatedIndex. Thus, in this example:

```
for k = 1:10
   rotatedIndex = (seqence2(k) + sequence1) modulo 12
   Layer2(1:12, clump k) = Layer 1(rotatedIndex, clump k);
end;
```

In this example, the scrambler 106 also generates watermark layer 3 using sequence 1 and sequence 3. For each of ten frequency clumps, the scrambler 106 computes a 12-length "rotatedIndex2" sequence, which is the modulo 12 sum of one member of sequence 3 and all twelve members of sequence 1. The scrambler 106 populates the twelve symbols of the watermark layer 3 in frequency clumps in sequence 1 to 12 by reading out members of the corresponding watermark layer 1 frequency clump, using the sequence, rotatedIndex2. Thus, in this example:

```
for k = 1:10
   rotatedIndex2 = (seqence3(k) + sequence1) modulo 12
   watermark layer3(1:12, clump k) = watermark layer
1(rotatedIndex2, clump k);
end;
```

In this example, the scrambler 106 produces three watermark layers with similar optimal zero-bin away relationship between the three watermark layers. The operations (sequence2(k)+sequence1)modulo 12 produce rotated versions of sequence1 when sequence1 and sequence2 have unique members.

In another example, the scrambler 106 applies the shift or rotation index to watermark layers 2 and 3. The scrambler 106 generate two sequences—sequence 1 with twelve unique members and sequence 2 with ten unique members. The scrambler 106 generates sequence 3 with ten unique members and ten unique differences with corresponding members of sequence 2. The scrambler generates the second watermark layer 2 frequencies using sequence 1 and sequence 2. For each of the ten clumps, the scrambler 106 computes a 12-length "rotatedIndex" sequence which is the modulo 12 sum of one member of sequence2 and all twelve members of sequence1. The scrambler 106 populates the twelve symbols of the watermark layer 2 in the frequency clumps in sequence rotatedIndex by reading out members of the corresponding watermark layer 1 frequency clump in sequence 1 to 12. Thus, in this example:

```
for k = 1:10
   rotatedIndex = (seqence2(k) + sequence1) modulo 12
   watermark layer2(rotatedIndex, clump k) = watermark layer
1(1:12, clump k);
end;
```

In this example, the scrambler 106 also generates watermark layer 3 using sequence 1 and sequence 3. For each of ten frequency clumps, the scrambler 106 computes a 12-length "rotatedIndex2" sequence, which is the modulo 12 sum of one member of sequence3 and all twelve members of sequence1. The scrambler 106 populates the twelve symbols of the watermark layer 3 in frequency clumps in sequence rotatedIndex2 by reading out members of the corresponding Layer 1 frequency clump in sequence 1 to 12. Thus, in this example:

```
for k = 1:10
   rotatedIndex2 = (seqence3(k) + sequence1) modulo 12
   watermark layer3(rotatedIndex2, clump k) = watermark layer
1(1:12, clump k);
end;
```

In another example, the scrambler 106 applies the rotation index to watermark layers 2 and 3, indexing into another random sequence, either sequence 1 or another 12-length sequence four with unique members. The scrambler 106 generates two sequences—sequence 1 with twelve unique members and sequence 2 with ten unique members. The scrambler 106 generates sequence 3 with ten unique members and ten unique differences with corresponding members of sequence 2. The scrambler 106 generates watermark layer 2 frequencies using sequence 1 and sequence 2. For each of 10 clumps, the scrambler 106 computes a 12-length "rotatedIndex" sequence which is the modulo 12 sum of one member of sequence2 and all twelve members of sequence1. The scrambler 106 populates the twelve symbols of the watermark layer 2 in frequency clumps in the sequence of sequence1 indexed by rotatedIndex by reading out members of the corresponding watermark layer 1 frequency clump in sequence 1 to 12. Thus, in this example:

```
for k = 1:10
   rotatedIndex = (seqence2(k) + sequence1) modulo 12
   watermark layer2(sequence1(rotatedIndex), clump k) = watermark
layer 1(1:12,clump k);
end;
```

In this example, the scrambler 106 generates watermark layer 3 using sequence 1 and sequence 3. For each of ten frequency clumps, the scrambler computes a 12-length rotatedIndex2" sequence, which is the modulo 12 sum of one member of sequence2 and all twelve members of sequence 1. The scrambler populates the twelve symbols of the watermark layer 3 in frequency clumps in the sequence: sequence1 indexed by rotatedIndex2 by reading out members of the corresponding watermark layer 1 frequency clump in sequence 1 to 12. Thus, in this example:

```
for k = 1:10
   rotatedIndex2 = (seqence3(k) + sequence1) modulo 12
   Layer3(sequence1(rotatedIndex2), clump k) = Layer 1(1:12,clump
k);
end;
```

In yet another example, the scrambler 106 applies the rotation index to watermark layers 2 and 3, indexing into another random sequence, either sequence 1 or another 12-length sequence four with unique members. The scrambler 106 generates two sequences—sequence 1 with twelve unique members and sequence 2 with ten unique members. The scrambler 106 generates sequence 3 with ten unique members and ten unique differences with corresponding members of sequence 2. The scrambler 106 generates a new sequence 4 of length twelve with unique members. The scrambler 106 generates watermark layer 2 frequencies using sequence 1, sequence 2, and sequence 4. The scrambler 106 computes a 12-length "rotatedIndex" sequence, which is the modulo 12 sum of one member of sequence2 and all twelve members of sequence1. The scrambler 106 populates the twelve symbols of the watermark layer 2 in frequency clumps in the sequence of: sequence4 indexed by rotatedIndex by reading out members of the corresponding watermark layer 1 frequency clump in sequence 1 to 12. Thus, in this example:

```
for k = 1:10
  rotatedIndex = (seqence2(k) + sequence1) modulo 12
  watermark layer2(sequence4(rotatedIndex), clump k) = watermark
layer 1(1:12,clump k);
end;
```

In addition, in this example, the scrambler 106 generates watermark layer 3 using sequence 1, sequence 3, and sequence 4. The scrambler 106 computes a 12-length "rotatedIndex2" sequence, which is the modulo 12 sum of one member of sequence2 and all twelve members of sequence 1. The scrambler 106 populates the twelve symbols of the watermark layer 3 in frequency clumps in the sequence of: sequence4 indexed by rotatedIndex2 by reading out members of the corresponding watermark layer 1 frequency clump in sequence 1 to 12. Thus, in this example:

```
for k = 1:10
  rotatedIndex2 = (seqence3(k) + sequence1) modulo 12
  watermark layer3(sequence4(rotatedIndex2), clump k) =
watermark layer 1(1:12,clump k);
end;
```

The scrambler 106 produces optimal distribution schemes under these examples because the operations (sequenceX (k)+sequenceY)modulo 12 produce uniquely scrambled versions of sequenceY when sequence and sequenceY have unique members.

While example manners of implementing the map builder 102, the encoder 110, and the decoder 138 are illustrated in FIG. 1, one or more of the elements, processes and/or devices illustrated in FIG. 1 may be combined, divided, re-arranged, omitted, eliminated and/or implemented in any other way. Further, the example data input 102, the example scrambler 106, the example map output 108, the example map input 112, the example audio input 114, the example audio converter 116, the example code input 117, the example code converter 118, the example adjuster 120, the example parser 122, the example synthesizer 124, the example audio output 126, the example encoder database 128, the example transmitter 130, the example receiver 134, the example media device 136, example encoded audio input 140, the example audio converter 142, the example bin analyzer 144, example code output 146, the example decoder database 148, and/or, more generally, the example map builder 102, the example encoder 110, and/or the example decoder 138 of FIG. 1 may be implemented by hardware, software, firmware, and/or any combination of hardware, software and/or firmware. Thus, for example, any of the example data input 102, the example scrambler 106, the example map output 108, the example map input 112, the example audio input 114, the example audio converter 116, the example code input 117, the example code converter 118, the example adjuster 120, the example parser 122, the example synthesizer 124, the example audio output 126, the example encoder database 128, the example transmitter 130, the example receiver 134, the example media device 136, example encoded audio input 140, the example audio converter 142, the example bin analyzer 144, example code output 146, the example decoder database 148, the example map builder 102, the example encoder 110, and/or the example decoder 138 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example data input 102, the example scrambler 106, the example map output 108, the example map input 112, the example audio input 114, the example audio converter 116, the example code input 117, the example code converter 118, the example adjuster 120, the example parser 122, the example synthesizer 124, the example audio output 126, the example encoder database 128, the example transmitter 130, the example receiver 134, the example media device 136, example encoded audio input 140, the example audio converter 142, the example bin analyzer 144, example code output 146, the example decoder database 148, the example map builder 102, the example encoder 110, and/or the example decoder 138 is/are hereby expressly defined to include a non-transitory computer readable storage device or storage disk such as a memory, a digital versatile disk (DVD), a compact disk (CD), a Blu-ray disk, etc. including the software and/or firmware. Further still, the example map builder 102 and/or the example encoder 110 of FIG. 1 may include one or more elements, processes and/or devices in addition to, or instead of, those illustrated in FIG. 1, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 13:
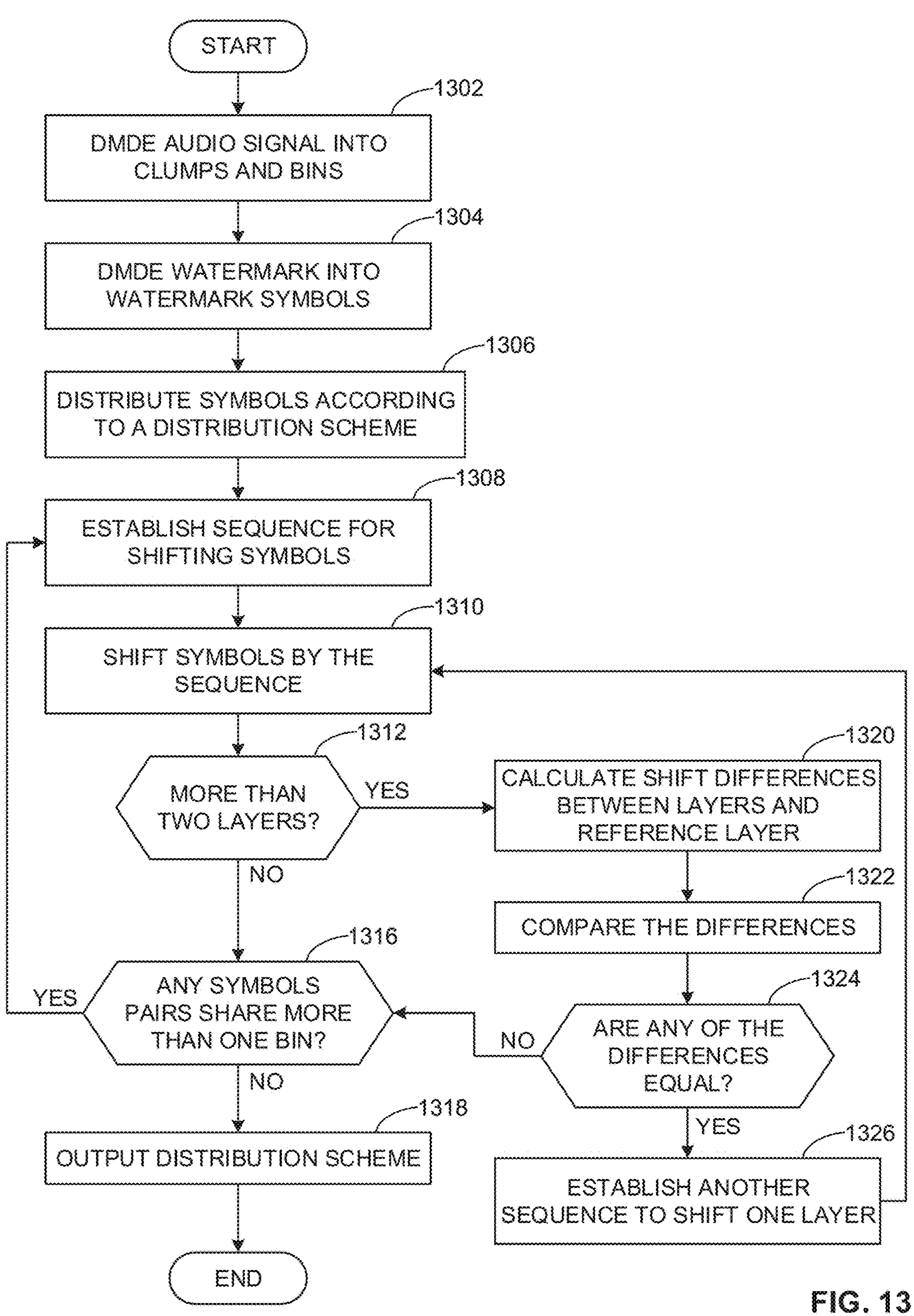
FIG. 13 is a flowchart representative of machine readable instructions which may be executed to implement the example encoding system of FIG. 1.
Figure 14:
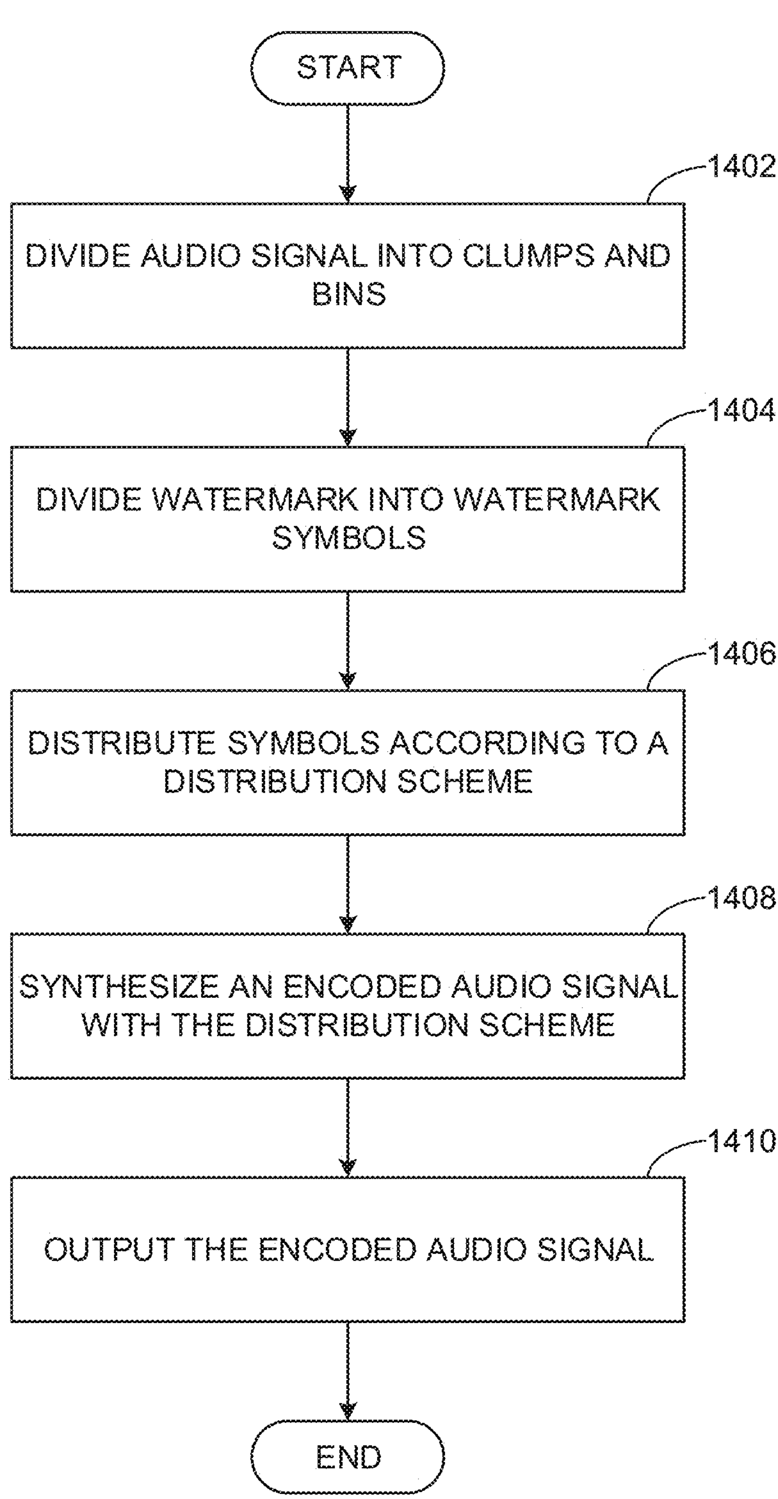
FIG. 14 is a flowchart representative of machine readable instructions which may be executed to implement the example encoding system of FIG. 1.

Flowcharts representative of example hardware logic, machine readable instructions, hardware implemented state machines, and/or any combination thereof for implementing the map builder 102 and/or the example 110 of FIG. 1 are shown in FIGS. 13 and 14. The machine readable instructions may be an executable program or portion of an executable program for execution by a computer processor such as the processor 1512 shown in the example processor platform 1500 discussed below in connection with FIG. 15. The program may be embodied in software stored on a non-transitory computer readable storage medium such as a CD-ROM, a floppy disk, a hard drive, a DVD, a Blu-ray disk, or a memory associated with the processor 1512, but the entire program and/or parts thereof could alternatively be executed by a device other than the processor 1512 and/or embodied in firmware or dedicated hardware. Further, although the example program is described with reference to the flowchart illustrated in FIGS. 13 and 14, many other methods of implementing the example map builder 102 and/or the example encoder 110 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 13 and 14 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

The program of FIG. 13 is an example operation of the example scrambler 106 of the example map builder 102 that generates or maps a distribution scheme for use by the example encoder 110 to encode watermarks into audio signals. The example program includes the scrambler 106 dividing an audio signal into a plurality of frequency clumps that include a plurality of frequency bins (block 1302). The scrambler 106 also divides the watermark that is to be encoded into the audio signal into the watermark symbols (block 1304). In some examples, the watermark is divided into watermark symbols before transmission to the map builder 102. In some examples, the divisions of blocks 1302 and 1304 are mappings or other representations of a distribution, division, etc.

The scrambler 106 distributes or maps the watermark symbols according to a distribution scheme (block 1306). For example, the scrambler 106 can distribute or map the watermark symbols as shown in FIG. 2 for a two-layer arrangement. Also, the scrambler 106 can distribute or map the watermark symbols as shown in FIG. 6 for a three-layer arrangement.

The scrambler 106 establishes a sequence for shifting the watermark symbols (block 1308) and shifts the watermark symbols by the sequence (block 1310). For example, in the two-layer arrangement example disclosed above, the scrambler 106 establishes a sequence that includes progressively shifting the columns as illustrated in FIGS. 4 and 5. In the three-layer arrangement example disclosed above (FIG. 8), the scrambler 106 establishes a sequence that includes shifting the second watermark layer (the lower row in each clump in FIG. 8) by the sequence of 0, 1, 3, 8, 9, 2, 5, 10, 4, 7 such that the first watermark symbol is not shifted in Clump 0, shifted by one cell in Clump 1, shifted by three cells in Clump 2, etc. In this three-layer arrangement example, the scrambler 106 also shifts the third watermark layer (the lowest row in each clump in FIG. 9) by the sequence of 0, 2, 5, 11, 1, 7, 3, 6, 10, 4.

The scrambler 106 also determines if there are more than two watermark layers to map to the distribution scheme (block 1312). If there are not more than two layers, the scrambler 106 reviews the distribution scheme and determines if there are any watermark symbol pairs that share more than one frequency bin (block 1316). For example, the scrambler 106 reviews the distribution scheme shown in FIG. 5 to determine if any of the watermark symbol pairs share more than one frequency bin. In the example of FIG. 5, there are no watermark symbol pairs that share more than one frequency bin. Thus, the example program continues, and the map builder 102 using, for example, the output 108, outputs the distribution scheme (block 1318). For example, the map builder 102 can transmit the distribution scheme to the encoder 110 so the encoder 110 can implement an optimal distribution scheme without having to spend the resources calculating the details of such scheme.

If the scrambler determines that there are watermark symbol pairs that do share more than one frequency bin (block 1316), the example program returns to block 1308. The scrambler 106 establishes a sequence for shifting the watermark symbols, and the example program continues.

If the scrambler 106 determines that there are more than two watermark layers (block 1312), the scrambler 106 calculates the shift differences between the watermark layers and the reference layer (block 1320). For example, in the three-layer arrangement example disclosed above, the scrambler 106 determines that shift differences between each of the second watermark layer and the third watermark layer with respect to the first watermark layer. The difference, in this example, is shown above in Table 4. The scrambler 106 determines if any of the differences are equal (block 1324). If none of the differences are equal, as shown in the example discussed above and in FIG. 4, the example program continues with the scrambler 106 determining if any of the watermark symbol pairs share more than one frequency bin (block 1316).

If the scrambler 106 determines that one or more of the shift differences between the second watermark layer and the first watermark layer and between the third watermark layer and the first watermark layer are equal (block 1324), the scrambler 106 establishes another sequence by which to shift one of the watermark layers (block 1326). The updated sequence is an effort to remove any equal shift differences. The example program then continues with the scrambler 106 shifting the watermark symbols by the sequence (block 1310). That is the scrambler 106 shifts the watermark symbols by the updated sequence developed at block 1326, and the program continues as disclosed above.

The example program continues until there are no equal differences in the shifts for multiple watermark layers (block 1324), and there are no watermark symbol pairs that share more than one frequency bin (block 1316). The output 108 outputs the distribution scheme (block 1318), and the program ends.

The program of FIG. 14 is an example operation of the example encoder 110 to encode watermarks into audio signals in accordance with a distribution scheme generated by the example scrambler 106 of the example map builder 102.

In the program of FIG. 14, the parser 122 divides the audio signal into a plurality of frequency clumps with a plurality of frequency bins in the plurality of frequency clumps (block 1402). The parser 122 divides the watermark into a plurality of watermark symbols (block 1404). The parser 122 distributes the watermark symbols to the plurality of frequency bins in the plurality of frequency clumps according to the distribution scheme (block 1406). For example, the parser 122 uses the distribution scheme mapped by the map builder 102 to distribute the watermark symbols and/or the multiple watermark layers, as disclosed above.

The synthesizer 124 synthesizes or generates an encoded audio signal with the watermark symbols distributed in the audio signal in the distribution scheme (block 1408). The audio output 126 outputs the encoded audio signal from the encoder 110 (block 1410). The example program of FIG. 14 then ends.

Figure 15:
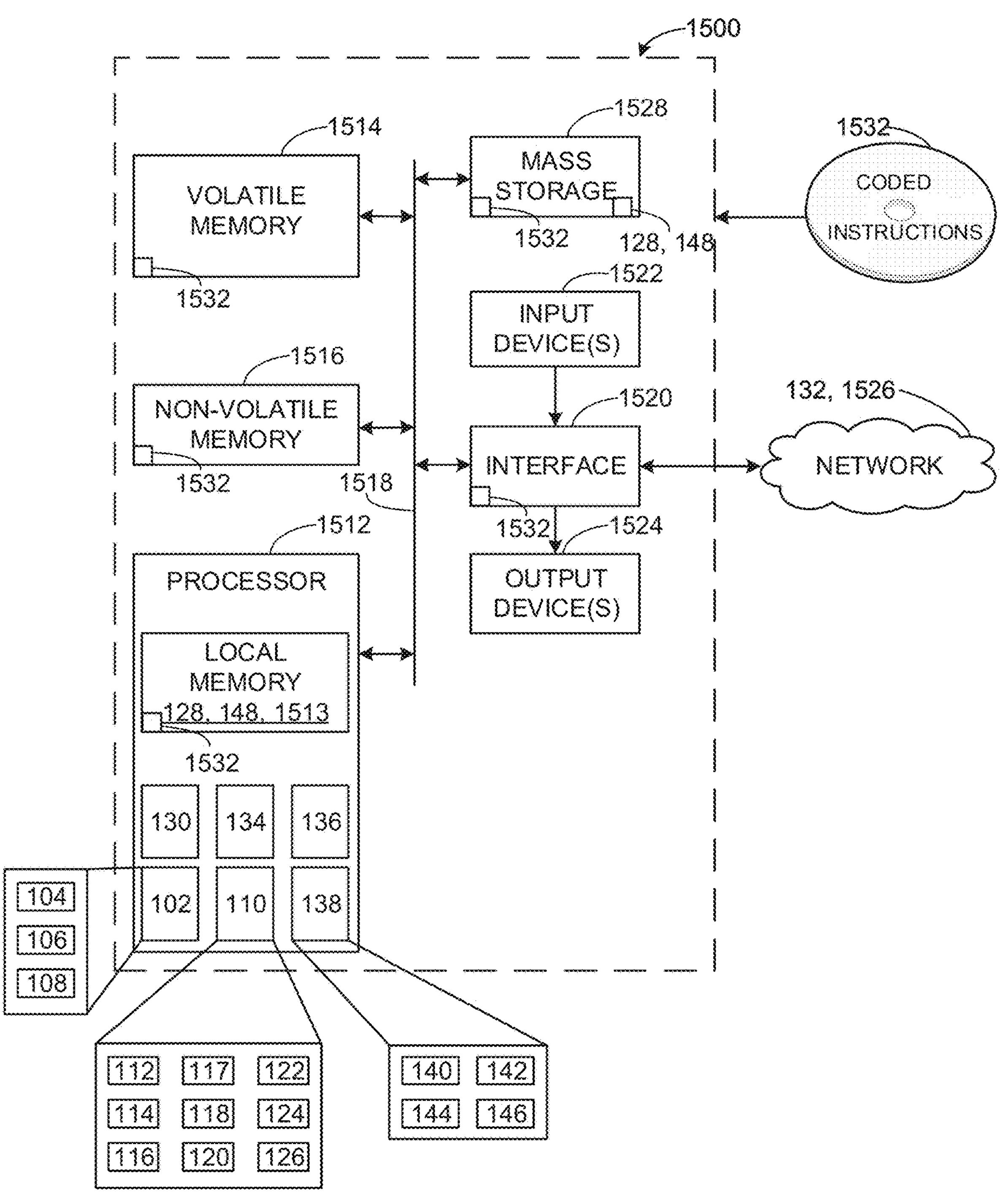
FIG. 15 is a block diagram of an example processing platform structured to execute the instructions of FIGS. 13 and 14 to implement the example encoding system of FIG. 1.

FIG. 15 is a block diagram of an example processor platform 1000 structured to execute the instructions of FIGS. 13 and 14 to implement the map builder 102, the encoder 110, and the decoder 138 of FIG. 1. The processor platform 1500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device. The processor platform 1500 of the illustrated example includes a processor 1512. The processor 1512 of the illustrated example is hardware. For example, the processor 1512 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1512 implements the example data input 102, the example scrambler 106, the example map output 108, the example map input 112, the example audio input 114, the example audio converter 116, the example code input 117, the example code converter 118, the example adjuster 120, the example parser 122, the example synthesizer 124, the example audio output 126, the example encoder database 128, the example transmitter 130, the example receiver 134, the example media device 136, example encoded audio input 140, the example audio converter 142, the example bin analyzer 144, example code output 146, the example decoder database 148, and/or, more generally, the example map builder 102, the example encoder 110, and/or the example decoder 138. The transmitter 130, the receiver 134, the media device 136, the map builder 102, the encoder 110, and the decoder 138 are all shown in FIG. 15 as implemented by the processor 1513 for ease of illustration. In some examples, different ones of the transmitter 130, the receiver 134, the media device 136, the map builder 102, the encoder 110, and the decoder 138 are combinable in different combinations. In other examples, transmitter 130, the receiver 134, the media device 136, the map builder 102, the encoder 110, and the decoder 138 are all separate devices and the processor 1512 representing these devices will be different processors in the different devices.

The processor 1512 of the illustrated example includes a local memory 1513 (e.g., a cache) (including the encoder database 128 and/or decoder database 148 depending on the configuration). The processor 1512 of the illustrated example is in communication with a main memory including a volatile memory 1514 and a non-volatile memory 1516 via a bus 1518. The volatile memory 1514 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1516 may be implemented by flash memory and/or any other desired type of memory device. Access to the main memory 1514, 1516 is controlled by a memory controller.

The processor platform 1500 of the illustrated example also includes an interface circuit 1520. The interface circuit 1520 may be implemented by any type of interface standard, such as an Ethernet interface, a universal serial bus (USB), a Bluetooth® interface, a near field communication (NFC) interface, and/or a PCI express interface.

In the illustrated example, one or more input devices 1522 are connected to the interface circuit 1520. The input device(s) 1522 permit(s) a user to enter data and/or commands into the processor 1512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1524 are also connected to the interface circuit 1520 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1520 of the illustrated example, thus, typically includes a graphics driver card, a graphics driver chip and/or a graphics driver processor.

The interface circuit 1520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1526 (including the network 132 of FIG. 1). The communication can be via, for example, an Ethernet connection, a digital subscriber line (DSL) connection, a telephone line connection, a coaxial cable system, a satellite system, a line-of-site wireless system, a cellular telephone system, etc.

The processor platform 1500 of the illustrated example also includes one or more mass storage devices 1528 for storing software and/or data. Examples of such mass storage devices 1528 include floppy disk drives, hard drive disks, compact disk drives, Blu-ray disk drives, redundant array of independent disks (RAID) systems, and digital versatile disk (DVD) drives.

The machine executable instructions 1532 of FIGS. 13 and 14 may be stored in the mass storage device 1528, in the volatile memory 1514, in the non-volatile memory 1516, and/or on a removable non-transitory computer readable storage medium such as a CD or DVD.

From the foregoing, it will be appreciated that example methods, apparatus and articles of manufacture have been disclosed that optimize the distribution of watermark symbols throughout frequency bins. In some examples, any group of N symbols from N watermarking layers, with one watermark symbol from each watermark layer, share at most N−1 frequency bins in common. The reduction in the number of shared frequency bins for watermark symbols in different watermark layers increases the detection distance between the watermarking layers, thereby reducing the probability of watermark detection errors. The quality and accuracy of the media information deduced or extracted from the detected watermarks is enhanced when there are fewer detection errors. In turn, more accurate media information allows for better crediting of media display and/or detection.

The disclosed methods, systems, apparatus and articles of manufacture improve the efficiency of using a computing device by configuring encoders with intelligent distribution schemes for the distribution of watermark symbols into audio signals. The configured encoders implement the distribution schemes at runtime and, therefore, do not have to spend any operating resources and time to calculate distribution schemes while an audio signal is being encoded. Random optimization takes too long and too much computer power. In addition, the examples disclosed herein enable intelligent preparation of layers and the addition of multiple layers upon multiple layers, which maximized the encoding capabilities of an audio signal while minimizes detection errors. The disclosed methods, apparatus and articles of manufacture are accordingly directed to one or more improvement(s) in the functioning of a computer.

Example systems, apparatus, methods, and articles of manufacture are disclosed for multiple scrambled layers for audio watermarking. An example system to map a distribution scheme for encoding an audio signal with a watermark is disclosed. The example system includes a scrambler executing instructions to: divide the watermark into a plurality of watermark symbols; map the watermark symbols to the plurality of frequency bins in the plurality of frequency clumps according to a first distribution scheme to create a first watermark layer having a first combination of the frequency bins and a second watermark layer having a second combination of the frequency bins, the first combination of the frequency bins and the second combination of the frequency bins partially overlap. The scrambler also is to determine a sequence for shifting watermark symbols among the frequency bins, and generate a second distribution scheme to map the watermark symbols in accordance with the sequence. The example system also includes a transceiver to communicate the second distribution scheme to a device.

In some examples, the sequence includes shifting the watermark symbols of the first watermark layer and the second watermark layer distributed to a first frequency bin in a first frequency clump to a second frequency bin in a second frequency clump to generate the second distribution scheme.

In some examples, the first frequency bin and the second frequency bin are separated by a first distance.

In some examples, the scrambler is to shift the watermark symbols of the first watermark layer and the second watermark layer distributed to a third frequency bin in the first frequency clump to a fourth frequency bin in a third frequency clump to generate the second distribution scheme.

In some examples, the third frequency bin and the fourth frequency bin are separated a second distance, the second distance different than the first distance.

In some examples, the scrambler is to shift the watermark symbols of the first watermark layer and the second watermark layer distributed to a fifth frequency bin in the first frequency clump to a sixth frequency bin in a fourth frequency clump to generate the second distribution scheme, fifth frequency bin and the sixth frequency bin are separated a third distance, the third distance different than the first distance or the second distance.

In some examples, the scrambler is to progressively shift the watermark symbols such that the first distance is less than the second distance, and the second distance is less than the third distance.

In some examples, the scrambler is to randomly shift the watermark symbols.

In some examples, with the shift of the watermark symbols from the first frequency clump to the second frequency clump, the scrambler is to shift the watermark symbols distributed in corresponding frequency bins in other frequency clumps by the first distance.

In some examples, wherein for n number of frequency bins in a frequency clump, the scrambler is to perform n−1 shifts of the watermark symbols of the first watermark layer and the second watermark layer to generate the second distribution scheme, different ones of the shifts moving the watermark symbols between different frequency clumps so the shifts are of different distances.

In some examples, the scrambler is to further shift the watermark symbols of the first watermark layer and the second watermark layer distributed to a third frequency bin in the first frequency clump to a fourth frequency bin in the first frequency clump.

In some examples, the sequence includes shifting the watermark symbols in the second watermark layer in the frequency clumps by a different distance for the different frequency clumps.

In some examples, wherein the sequence is a first sequence, the scrambler to: map the watermark symbols to the plurality of frequency bins in the plurality of frequency clumps according to the first distribution scheme to create a third watermark layer having a third combination of the frequency bins, the third combination of the frequency bins at least partially overlapping with the first combination of the frequency bins and the second combination of the frequency bins; determine a second sequence for shifting watermark symbols among the frequency bins; and generate the second distribution scheme to map the watermark symbols in the third layer in the frequency clumps in accordance with the second sequence.

In some examples, the second sequence includes shifting the watermark symbols in the third watermark layer in the frequency clumps by a different distance for the different frequency clumps.

In some examples, the scrambler is to: determine respective differences between the shifts of the second layer in the first sequence and the shifts of the third layer in the second sequence for the frequency clumps; compare the differences; determine if any two of the difference are equal; and in response to two of the differences being equal, determine a third sequence for shifting the watermark symbols in the third watermark layer to replace the second sequence.

In some examples, wherein the scrambler is to randomly reorganize the watermark symbols in the second watermark layer based on the first watermark layer, and the sequence includes shifting the watermark symbols in the second watermark layer in the frequency clumps by a different distance for the different frequency clumps.

In some examples, wherein the sequence is a first sequence, and the frequency bins contain a pair of symbols that include a symbol from the first layer and a symbol from the second layer, the scrambler to: determine if a pair of symbols shares more than one frequency bin; based on a determination that a pair of symbols shares more than one frequency bin, determine a second sequence for shifting watermark symbols between frequency bins; and map the watermark symbols in accordance with the second sequence to generate the second distribution scheme.

In some examples, the scrambler is to: map the watermark symbols to the plurality of frequency bins in the plurality of frequency clumps according to the first distribution scheme to create N watermark layers; and generate the sequence for shifting watermark symbols among the frequency bins so that combinations of N watermark symbols that include one watermark symbol from each watermark layer share a maximum of N−1 frequency bins.

An example encoder for encoding an audio signal with a watermark is disclosed. The example encoder includes a parser to: divide the audio signal into a plurality of frequency clumps with a plurality of frequency bins in the plurality of frequency clumps; divide the watermark into a N number of watermark symbols; and distribute the watermark symbols to the plurality of frequency bins in the plurality of frequency clumps according to a distribution scheme to create N watermark layers, so that combinations of N watermark symbols that include one watermark symbol from each watermark layer share a maximum of N−1 frequency bins. The example encoder also includes a synthesizer to synthesize an encoded audio signal with the watermark symbols distributed in the audio signal in the second distribution scheme.

An example system to map a distribution scheme for encoding an audio signal with a watermark is disclosed. The example system includes processing means for executing instructions. The processing means is to: divide the watermark into a plurality of watermark symbols; map the watermark symbols to the plurality of frequency bins in the plurality of frequency clumps according to a first distribution scheme to create a first watermark layer having a first combination of the frequency bins and a second watermark layer having a second combination of the frequency bins, the first combination of the frequency bins and the second combination of the frequency bins partially overlap; determine a sequence for shifting watermark symbols among the frequency bins; and generate a second distribution scheme to map the watermark symbols in accordance with the sequence. The example system also includes means for communicating the second distribution scheme to a device.

In some examples, the processing means is to shift the watermark symbols of the first watermark layer and the second watermark layer distributed to a third frequency bin in the first frequency clump to a fourth frequency bin in a third frequency clump to generate the second distribution scheme.

In some examples, the processing means is to shift the watermark symbols of the first watermark layer and the second watermark layer distributed to a fifth frequency bin in the first frequency clump to a sixth frequency bin in a fourth frequency clump to generate the second distribution scheme, fifth frequency bin and the sixth frequency bin are separated a third distance, the third distance different than the first distance or the second distance.

In some examples, the processing means is to progressively shift the watermark symbols such that the first distance is less than the second distance, and the second distance is less than the third distance.

In some examples, the processing means is to randomly shift the watermark symbols.

In some examples, with the shift of the watermark symbols from the first frequency clump to the second frequency clump, the processing means is to shift the watermark symbols distributed in corresponding frequency bins in other frequency clumps by the first distance.

In some examples, for n number of frequency bins in a frequency clump, the processing means is to perform n−1 shifts of the watermark symbols of the first watermark layer and the second watermark layer to generate the second distribution scheme, different ones of the shifts moving the watermark symbols between different frequency clumps so the shifts are of different distances.

In some examples, the processing means is to further shift the watermark symbols of the first watermark layer and the second watermark layer distributed to a third frequency bin in the first frequency clump to a fourth frequency bin in the first frequency clump.

In some examples, the sequence is a first sequence, the processing means to: map the watermark symbols to the plurality of frequency bins in the plurality of frequency clumps according to the first distribution scheme to create a third watermark layer having a third combination of the frequency bins, the third combination of the frequency bins at least partially overlapping with the first combination of the frequency bins and the second combination of the frequency bins; determine a second sequence for shifting watermark symbols among the frequency bins; and generate the second distribution scheme to map the watermark symbols in the third layer in the frequency clumps in accordance with the second sequence.

In some examples, the processing means is to: determine respective differences between the shifts of the second layer in the first sequence and the shifts of the third layer in the second sequence for the frequency clumps; compare the differences; determine if any two of the difference are equal; and in response to two of the differences being equal, determine a third sequence for shifting the watermark symbols in the third watermark layer to replace the second sequence.

In some examples, the processing means is to randomly reorganize the watermark symbols in the second watermark layer based on the first watermark layer, and the sequence includes shifting the watermark symbols in the second watermark layer in the frequency clumps by a different distance for the different frequency clumps.

In some examples, the sequence is a first sequence, and the frequency bins contain a pair of symbols that include a symbol from the first layer and a symbol from the second layer, the processing means to: determine if a pair of symbols shares more than one frequency bin; based on a determination that a pair of symbols shares more than one frequency bin, determine a second sequence for shifting watermark symbols between frequency bins; and map the watermark symbols in accordance with the second sequence to generate the second distribution scheme.

In some examples, the processing means is to: map the watermark symbols to the plurality of frequency bins in the plurality of frequency clumps according to the first distribution scheme to create N watermark layers; and generate the sequence for shifting watermark symbols among the frequency bins so that combinations of N watermark symbols that include one watermark symbol from each watermark layer share a maximum of N−1 frequency bins.

An example encoder for adding a watermark to an audio signal is disclosed. The example encoder includes means for encoding the audio signal, the means for encoding to: divide the audio signal into a plurality of frequency clumps with a plurality of frequency bins in the plurality of frequency clumps; divide the watermark into a N number of watermark symbols; and distribute the watermark symbols to the plurality of frequency bins in the plurality of frequency clumps according to a distribution scheme to create N watermark layers, so that combinations of N watermark symbols that include one watermark symbol from each watermark layer share a maximum of N−1 frequency bins; and means for synthesizing an encoded audio signal with the watermark symbols distributed in the audio signal in the second distribution scheme.

An example non-transitory computer readable storage medium is disclosed that includes computer readable instructions that, when executed, cause one or more processors to, at least: divide a watermark into a plurality of watermark symbols; map the watermark symbols to a plurality of frequency bins in a plurality of frequency clumps according to a first distribution scheme to create a first watermark layer having a first combination of the frequency bins and a second watermark layer having a second combination of the frequency bins, the first combination of the frequency bins and the second combination of the frequency bins partially overlap; determine a sequence for shifting watermark symbols among the frequency bins; and generate a second distribution scheme to map the watermark symbols in accordance with the sequence.

In some examples, the instructions cause the one or more processors to shift the watermark symbols of the first watermark layer and the second watermark layer distributed to a third frequency bin in the first frequency clump to a fourth frequency bin in a third frequency clump to generate the second distribution scheme.

In some examples, the instructions cause the one or more processors to shift the watermark symbols of the first watermark layer and the second watermark layer distributed to a fifth frequency bin in the first frequency clump to a sixth frequency bin in a fourth frequency clump to generate the second distribution scheme, fifth frequency bin and the sixth frequency bin are separated a third distance, the third distance different than the first distance or the second distance.

In some examples, the instructions cause the one or more processors to progressively shift the watermark symbols such that the first distance is less than the second distance, and the second distance is less than the third distance.

In some examples, the instructions cause the one or more processors to randomly shift the watermark symbols.

In some examples, with the shift of the watermark symbols from the first frequency clump to the second frequency clump, the instructions cause the one or more processors to shift the watermark symbols distributed in corresponding frequency bins in other frequency clumps by the first distance.

In some examples, for n number of frequency bins in a frequency clump, the instructions cause the one or more processors to perform n−1 shifts of the watermark symbols of the first watermark layer and the second watermark layer to generate the second distribution scheme, different ones of the shifts moving the watermark symbols between different frequency clumps so the shifts are of different distances.

In some examples, the instructions cause the one or more processors to further shift the watermark symbols of the first watermark layer and the second watermark layer distributed to a third frequency bin in the first frequency clump to a fourth frequency bin in the first frequency clump.

In some examples, the sequence is a first sequence, the instructions cause the one or more processors to: map the watermark symbols to the plurality of frequency bins in the plurality of frequency clumps according to the first distribution scheme to create a third watermark layer having a third combination of the frequency bins, the third combination of the frequency bins at least partially overlapping with the first combination of the frequency bins and the second combination of the frequency bins; determine a second sequence for shifting watermark symbols among the frequency bins; and generate the second distribution scheme to map the watermark symbols in the third layer in the frequency clumps in accordance with the second sequence.

In some examples, the instructions cause the one or more processors to: determine respective differences between the shifts of the second layer in the first sequence and the shifts of the third layer in the second sequence for the frequency clumps; compare the differences; determine if any two of the difference are equal; and in response to two of the differences being equal, determine a third sequence for shifting the watermark symbols in the third watermark layer to replace the second sequence.

In some examples, the instructions cause the one or more processors to randomly reorganize the watermark symbols in the second watermark layer based on the first watermark layer, and the sequence includes shifting the watermark symbols in the second watermark layer in the frequency clumps by a different distance for the different frequency clumps.

In some examples, the sequence is a first sequence, and the frequency bins contain a pair of symbols that include a symbol from the first layer and a symbol from the second layer, the instructions cause the one or more processors to: determine if a pair of symbols shares more than one frequency bin; based on a determination that a pair of symbols shares more than one frequency bin, determine a second sequence for shifting watermark symbols between frequency bins; and map the watermark symbols in accordance with the second sequence to generate the second distribution scheme.

In some examples, the instructions cause the one or more processors to: map the watermark symbols to the plurality of frequency bins in the plurality of frequency clumps according to the first distribution scheme to create N watermark layers; and generate the sequence for shifting watermark symbols among the frequency bins so that combinations of N watermark symbols that include one watermark symbol from each watermark layer share a maximum of N−1 frequency bins.

An example non-transitory computer readable storage medium is disclosed that includes computer readable instructions that, when executed, cause one or more processors to, at least: divide an audio signal into a plurality of frequency clumps with a plurality of frequency bins in the plurality of frequency clumps; divide the watermark into a N number of watermark symbols; distribute the watermark symbols to the plurality of frequency bins in the plurality of frequency clumps according to a distribution scheme to create N watermark layers, so that combinations of N watermark symbols that include one watermark symbol from each watermark layer share a maximum of N−1 frequency bins; and synthesize an encoded audio signal with the watermark symbols distributed in the audio signal in the second distribution scheme.

An example method to map a distribution scheme for encoding an audio signal with a watermark is disclosed. The example method includes dividing, by executing an instruction with a processor, the watermark into a plurality of watermark symbols; mapping, by executing an instruction with the processor, the watermark symbols to the plurality of frequency bins in the plurality of frequency clumps according to a first distribution scheme to create a first watermark layer having a first combination of the frequency bins and a second watermark layer having a second combination of the frequency bins, the first combination of the frequency bins and the second combination of the frequency bins partially overlap; determining, by executing an instruction with the processor, a sequence for shifting watermark symbols among the frequency bins; generating, by executing an instruction with the processor, a second distribution scheme to map the watermark symbols in accordance with the sequence; and communicating the second distribution scheme to a device.

In some examples, the method includes shifting, by executing an instruction with the processor, the watermark symbols of the first watermark layer and the second watermark layer distributed to a third frequency bin in the first frequency clump to a fourth frequency bin in a third frequency clump to generate the second distribution scheme.

In some examples, the method includes shifting, by executing an instruction with the processor, the watermark symbols of the first watermark layer and the second watermark layer distributed to a fifth frequency bin in the first frequency clump to a sixth frequency bin in a fourth frequency clump to generate the second distribution scheme, fifth frequency bin and the sixth frequency bin are separated a third distance, the third distance different than the first distance or the second distance.

In some examples, the method includes progressively shifting, by executing an instruction with the processor, the watermark symbols such that the first distance is less than the second distance, and the second distance is less than the third distance.

In some examples, the method includes randomly shifting, by executing an instruction with the processor, the watermark symbols.

In some examples, with the shift of the watermark symbols from the first frequency clump to the second frequency clump, the method includes shifting, by executing an instruction with the processor, the watermark symbols distributed in corresponding frequency bins in other frequency clumps by the first distance.

In some examples, for n number of frequency bins in a frequency clump, the method further includes performing, by executing an instruction with the processor, n−1 shifts of the watermark symbols of the first watermark layer and the second watermark layer to generate the second distribution scheme, different ones of the shifts moving the watermark symbols between different frequency clumps so the shifts are of different distances.

In some examples, the method includes shifting, by executing an instruction with the processor, the watermark symbols of the first watermark layer and the second watermark layer distributed to a third frequency bin in the first frequency clump to a fourth frequency bin in the first frequency clump.

In some examples, the sequence is a first sequence, the method further including: mapping, by executing an instruction with the processor, the watermark symbols to the plurality of frequency bins in the plurality of frequency clumps according to the first distribution scheme to create a third watermark layer having a third combination of the frequency bins, the third combination of the frequency bins at least partially overlapping with the first combination of the frequency bins and the second combination of the frequency bins; determining, by executing an instruction with the processor, a second sequence for shifting watermark symbols among the frequency bins; and generating, by executing an instruction with the processor, the second distribution scheme to map the watermark symbols in the third layer in the frequency clumps in accordance with the second sequence.

In some examples, the method includes determining, by executing an instruction with the processor, respective differences between the shifts of the second layer in the first sequence and the shifts of the third layer in the second sequence for the frequency clumps; comparing, by executing an instruction with the processor, the differences; determining, by executing an instruction with the processor, if any two of the difference are equal; and in response to two of the differences being equal, determining, by executing an instruction with the processor, a third sequence for shifting the watermark symbols in the third watermark layer to replace the second sequence.

In some examples, the method includes randomly reorganizing, by executing an instruction with the processor, the watermark symbols in the second watermark layer based on the first watermark layer, and the sequence includes shifting the watermark symbols in the second watermark layer in the frequency clumps by a different distance for the different frequency clumps.

In some examples, the sequence is a first sequence, and the frequency bins contain a pair of symbols that include a symbol from the first layer and a symbol from the second layer, the method further including: determining, by executing an instruction with the processor, if a pair of symbols shares more than one frequency bin; based on a determination that a pair of symbols shares more than one frequency bin, determining, by executing an instruction with the processor, a second sequence for shifting watermark symbols between frequency bins; and mapping, by executing an instruction with the processor, the watermark symbols in accordance with the second sequence to generate the second distribution scheme.

In some examples, the method includes mapping, by executing an instruction with the processor, the watermark symbols to the plurality of frequency bins in the plurality of frequency clumps according to the first distribution scheme to create N watermark layers; and generating, by executing an instruction with the processor, the sequence for shifting watermark symbols among the frequency bins so that combinations of N watermark symbols that include one watermark symbol from each watermark layer share a maximum of N−1 frequency bins.

An example method for encoding an audio signal with a watermark is disclosed. The example method includes dividing, by executing an instruction with the processor, the audio signal into a plurality of frequency clumps with a plurality of frequency bins in the plurality of frequency clumps; dividing, by executing an instruction with the processor, the watermark into a N number of watermark symbols; distributing, by executing an instruction with the processor, the watermark symbols to the plurality of frequency bins in the plurality of frequency clumps according to a distribution scheme to create N watermark layers, so that combinations of N watermark symbols that include one watermark symbol from each watermark layer share a maximum of N−1 frequency bins; and synthesizing an encoded audio signal with the watermark symbols distributed in the audio signal in the second distribution scheme.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A system comprising:

a processor; and a non-transitory computer-readable storage medium comprising instructions that, when executed by the processor, cause the processor to:

map watermark symbols to first pluralities of frequency bins over a plurality of frequency clumps based on a first bin distribution corresponding to a first watermark layer;

map the watermark symbols to second pluralities of frequency bins over the plurality of frequency clumps based on a second bin distribution corresponding to a second watermark layer, the second bin distribution related to the first bin distribution based on a first sequence of shifts;

determine a second sequence of shifts different from the first sequence of shifts;

generate a third bin distribution corresponding to a third watermark layer based on the second sequence of shifts, the third bin distribution to map the watermark symbols to third pluralities of frequency bins over the plurality of frequency clumps;

communicate the third bin distribution to an encoder to enable the encoder to generate an encoded audio signal with the watermark symbols based on the third bin distribution; and communicate the third bin distribution to a decoder to enable the decoder to extract the watermark symbols from the encoded audio signal.

2. The system of claim 1, wherein the instructions cause the processor to randomly determine the second sequence of shifts.

3. The system of claim 1, wherein the instructions cause the processor to:

determine if a first watermark symbol and a second watermark symbol share more than one frequency bin between the third watermark layer and at least one of the first watermark layer or the second watermark layer;

in response to a determination that the first watermark symbol and the second watermark symbol share more than one frequency bin, determine a third sequence of shifts different from the second sequence of shifts; and generate the third bin distribution based on the third sequence of shifts.

4. The system of claim 1, wherein the first bin distribution maps a first watermark symbol to a first frequency bin of a first frequency clump and a second frequency bin of a second frequency clump in the first watermark layer, and maps a second watermark symbol to the first frequency bin of the first frequency clump and a third frequency bin of the second frequency clump in the second watermark layer, the third frequency bin different from the second frequency bin.

5. The system of claim 4, wherein the second bin distribution maps the first watermark symbol to a fourth frequency bin of the second frequency clump in the third watermark layer and maps the second watermark symbol to a fifth frequency bin of the second frequency clump in the third watermark layer, the fourth frequency bin different from the third frequency bin, the fifth frequency bin different from the fourth frequency bin.

6. The system of claim 5, wherein the second frequency bin and the third frequency bin are separated by a first distance and the fourth frequency bin and the fifth frequency bin are separated by a second distance different from the first distance.

7. A non-transitory computer-readable storage medium comprising instructions that, when executed by one or more processors, cause the one or more processors to at least:

map watermark symbols to first pluralities of frequency bins over a plurality of frequency clumps based on a first bin distribution corresponding to a first watermark layer;

map the watermark symbols to second pluralities of frequency bins over the plurality of frequency clumps based on a second bin distribution corresponding to a second watermark layer, the second bin distribution related to the first bin distribution based on a first sequence of shifts;

determine a second sequence of shifts different from the first sequence of shifts;

generate a third bin distribution corresponding to a third watermark layer based on the second sequence of shifts, the third bin distribution to map the watermark symbols to third pluralities of frequency bins over the plurality of frequency clumps;

communicate the third bin distribution to an encoder to enable the encoder to generate an encoded audio signal with the watermark symbols based on the third bin distribution; and communicate the third bin distribution to a decoder to enable the decoder to extract the watermark symbols from the encoded audio signal.

8. The storage medium of claim 7, wherein the instructions are to cause the one or more processors to randomly determine the second sequence of shifts.

9. The storage medium of claim 7, wherein the instructions are to cause the one or more processors to:

determine if a first watermark symbol and a second watermark symbol share more than one frequency bin between the third watermark layer and at least one of the first watermark layer or the second watermark layer;

in response to a determination that the first watermark symbol and the second watermark symbol share more than one frequency bin, determine a third sequence of shifts different from the second sequence of shifts; and generate the third bin distribution based on the third sequence of shifts.

10. The storage medium of claim 7, wherein the instructions are to cause the one or more processors to embed a first watermark symbol and a second watermark symbol in an audio signal, the first watermark symbol corresponding to one of the first pluralities of frequency bins and the second watermark symbol corresponding to one of the third pluralities of frequency bins.

11. The storage medium of claim 7, wherein the first bin distribution maps a first watermark symbol to a first frequency bin of a first frequency clump and a second frequency bin of a second frequency clump in the first watermark layer, and maps a second watermark symbol to the first frequency bin of the first frequency clump and a third frequency bin of the second frequency clump in the second watermark layer, the third frequency bin different from the second frequency bin.

12. The storage medium of claim 11, wherein the second bin distribution maps the first watermark symbol to a fourth frequency bin of the second frequency clump in the third watermark layer and maps the second watermark symbol to a fifth frequency bin of the second frequency clump in the third watermark layer, the fourth frequency bin different from the third frequency bin, the fifth frequency bin different from the fourth frequency bin.

13. The storage medium of claim 12, wherein the second frequency bin and the third frequency bin are separated by a first distance and the fourth frequency bin and the fifth frequency bin are separated by a second distance different from the first distance.

14. A method comprising:

mapping watermark symbols to first pluralities of frequency bins over a plurality of frequency clumps based on a first bin distribution corresponding to a first watermark layer;

mapping the watermark symbols to second pluralities of frequency bins over the plurality of frequency clumps based on a second bin distribution corresponding to a second watermark layer, the second bin distribution related to the first bin distribution based on a first sequence of shifts;

determining, by executing an instruction with a processor, a second sequence of shifts different from the first sequence of shifts;

generating, by executing an instruction with the processor, a third bin distribution corresponding to a third watermark layer based on the second sequence of shifts, the third bin distribution to map the watermark symbols to third pluralities of frequency bins over the plurality of frequency clumps;

communicating the third bin distribution to an encoder to enable the encoder to generate an encoded audio signal with the watermark symbols based on the third bin distribution; and communicating the third bin distribution to a decoder to enable the decoder to extract the watermark symbols from the encoded audio signal.

15. The method of claim 14, wherein the second sequence of shifts is determined randomly.

16. The method of claim 14, further including:

determining if a first watermark symbol and a second watermark symbol share more than one frequency bin between the third watermark layer and at least one of the first watermark layer or the second watermark layer;

in response to determining that the first watermark symbol and the second watermark symbol share more than one frequency bin, determining a third sequence of shifts different from the second sequence of shifts; and generating the third bin distribution based on the third sequence of shifts.

17. The method of claim 14, wherein the first bin distribution maps a first watermark symbol to a first frequency bin of a first frequency clump and a second frequency bin of a second frequency clump in the first watermark layer, and maps a second watermark symbol to the first frequency bin of the first frequency clump and a third frequency bin of the second frequency clump in the second watermark layer, the third frequency bin different from the second frequency bin.

18. The method of claim 17, wherein the second bin distribution maps the first watermark symbol to a fourth frequency bin of the second frequency clump in the third watermark layer and maps the second watermark symbol to a fifth frequency bin of the second frequency clump in the third watermark layer, the fourth frequency bin different from the third frequency bin, the fifth frequency bin different from the fourth frequency bin.

19. The method of claim 18, wherein the second frequency bin and the third frequency bin are separated by a first distance and the fourth frequency bin and the fifth frequency bin are separated by a second distance different from the first distance.

* * * * *